US012452249B2

(12) United States Patent
Subotic

(10) Patent No.: US 12,452,249 B2
(45) Date of Patent: Oct. 21, 2025

(54) ACTION BASED ON PRE-IMPLEMENTATION DETERMINATION WHETHER A PROPOSED ROLE ASSIGNMENT ASSOCIATED WITH A ROLE HIERARCHY CONFORMS TO SECURITY PROPERTIES

(71) Applicant: MICROSOFT TECHNOLOGY LICENSING, LLC, Redmond, WA (US)

(72) Inventor: Pavle Subotic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 18/170,497

(22) Filed: Feb. 16, 2023

(65) Prior Publication Data

US 2024/0283797 A1    Aug. 22, 2024

(51) Int. Cl.
*H04L 9/40*    (2022.01)
(52) U.S. Cl.
CPC .......... *H04L 63/104* (2013.01); *H04L 63/105* (2013.01); *H04L 63/20* (2013.01)
(58) Field of Classification Search
CPC ...... H04L 63/104; H04L 63/105; H04L 63/20
USPC .......................................................... 726/4
See application file for complete search history.

(56) References Cited

U.S. PATENT DOCUMENTS

| | | | | |
|---|---|---|---|---|
| 8,463,819 | B2 * | 6/2013 | Shashikumar | H04L 63/083 |
| | | | | 713/168 |
| 10,032,045 | B2 * | 7/2018 | Barrett | H04L 9/3226 |
| 10,032,124 | B1 * | 7/2018 | Reddy | G06Q 10/06311 |
| 11,483,317 | B1 * | 10/2022 | Bolignano | G06F 21/577 |
| 2006/0015416 | A1 * | 1/2006 | Hoffman | G06Q 10/06 |
| | | | | 705/28 |
| 2016/0182527 | A1 * | 6/2016 | Lietz | G06F 21/604 |
| | | | | 726/6 |
| 2019/0362087 | A1 | 11/2019 | Ferrans | |

(Continued)

OTHER PUBLICATIONS

NPL Search Terms (Year: 2025).*

(Continued)

*Primary Examiner* — Syed A Zaidi
(74) *Attorney, Agent, or Firm* — Wade IP Law PLLC

(57) ABSTRACT

Techniques are described herein that are capable of performing an action based on a pre-implementation determination whether a proposed role assignment associated with a dynamic role hierarchy conforms to security properties. Role assignments, assigning roles to principals, and a proposed role assignment are identified. Impacted role assignments are selected from the role assignments. A static policy, which is defined by the impacted role assignments and the proposed role assignment, is generated. The static policy is converted into a first logical artifact. A specification and a relationship property are converted into a second logical artifact. The specification includes security properties defining boundaries of allowed actions and disallowed actions. The relationship property defines a relationship between the specification and the static policy. Prior to implementation of the proposed role assignment, the first and second logical artifacts are compared to determine whether the proposed role assignment conforms to the security properties.

20 Claims, 11 Drawing Sheets

(56) References Cited

U.S. PATENT DOCUMENTS

2020/0311293 A1* 10/2020 Hartlaub ................ G06F 7/523
2022/0385667 A1* 12/2022 Ghiold ................ H04L 63/105

OTHER PUBLICATIONS

"Grammar of the IAM JSON policy language", Retrieved From: https://web.archive.org/web/20221030134450/https://docs.aws.amazon.com/IAM/latest/UserGuide/reference_policies_grammar.html, Oct. 30, 2022, 9 Pages.
Backes, et al., "Semantic-based automated reasoning for AWS access policies using SMT", In Proceedings of Formal Methods in Computer Aided Design, Oct. 30, 2018, 9 Pages.
Hughes, et al., "Automated Verification of Access Control Policies using a SAT Solver", In International Journal on Software tools for Technology Transfer, vol. 10, Issue 6, Oct. 21, 2008, pp. 503-520.
Jayaraman, et al., "Automated Analysis and Debugging of Network Connectivity Policies", In MSR-TR-2014-102, Jul. 2014, 2 Pages.
Moura, et al., "Z3: An efficient SMT solver", In International Conference on Tools and Algorithms for the Construction and Analysis of Systems, Mar. 29, 2008, pp. 337-340.
Niv, Daniel, "Hunting Azure Blobs Exposes Millions of Sensitive Files", Retrieved From: https://www.cyberark.com/resources/threat-research-blog/hunting-azure-blobs-exposes-millions-of-sensitive-files, Feb. 3, 2021, 9 Pages.
International Search Report and Written Opinion received for PCT Application No. PCT/US24/014910, Apr. 26, 2024, 15 pages.
International Preliminary Report on Patentability (Chapter I) received for PCT Application No. PCT/US2024/014910, mailed on Aug. 28, 2025, 10 pages.

* cited by examiner

1000

Rule 1: $[\pi_0 \ldots \pi_n \in \Pi] = \bigvee_{0 \ldots n} [\pi_i]$

Rule 2: $[(p, (\{a\}, \{\bar{a}\}), s) \in \pi] = [p] \wedge [(\{a\}, \{\bar{a}\})] \wedge [s]$ Rule 3: $[p \in P] = V_p \Leftrightarrow p$ Rule 4: $[(\{a\}, \{\bar{a}\})] = ([\{a\}] \wedge (\neg[\{\bar{a}\}]))$ Rule 5: $[a_0 \ldots a_n \in \{a\}] = \bigvee_{a_i \in \{a\}} [a_i]$ Rule 6: $[s \in S] = V_s \Leftrightarrow s$ Rule 7: $[a_k \in ucString] = \begin{cases} pfx(s1, V_a) \wedge sfx(s2, V_a) & \textit{iff } * \in str \wedge str = s1 * s2 \\ pfx(s1, V_a) \wedge contains(s2, V_a) \wedge sfx(s3, V_a) & \textit{iff } * \in str \wedge str = s1 * s2 * s3 \end{cases}$

FIG. 10

ACTION BASED ON PRE-IMPLEMENTATION DETERMINATION WHETHER A PROPOSED ROLE ASSIGNMENT ASSOCIATED WITH A ROLE HIERARCHY CONFORMS TO SECURITY PROPERTIES

BACKGROUND

Access control is a process of controlling access of users to resources, such as emails, databases, data, and applications. For instance, users who have a requisite permission may be granted access to a resource, whereas users who do not have the requisite permission may be denied access to the resource. Role-based access control (RBAC) is access control in which a mapping between users and roles is used to define permissions regarding access to resources. For instance, access to the resources may be controlled by assigning the users (e.g., groups of the users) to roles for particular resources.

Access control typically is a dynamic process. For instance, users, resources, and permissions may change quite frequently. An entity that updates the access control by adding, removing, or changing a user, a resource, or a permission may not be aware of the existing users, resources, and permissions that define a pre-update state of the access control, which existed prior to the update. The access control may be so complex that the entity is unable to manually determine whether the update to the access control conflicts with the pre-update state or a threat model of an organization.

Accordingly, the mere existence of access controls does not automatically ensure security of resources. While roles may embody security access control rules of an organization at a particular time, fundamental security boundaries of the organization often are encoded using invariant security properties (e.g., best practices or threat models) that transcend the roles. The dynamic nature of RBAC (e.g., adding or removing roles, attaching to groups, or scopes) creates a challenge to guaranteeing adherence to the invariant security properties, which may lead to exposure of sensitive data, such as personally identifiable information, personal health records, financial data, invoices, contracts, and so on.

SUMMARY

It may be desirable to determine whether a proposed role assignment conforms to security properties of a specification before implementation of the proposed role assignment. For instance, if the proposed role assignment does not conform to the security properties, implementation of the proposed role assignment may compromise security of resources, for example, by granting permissions regarding the resources that the security properties prohibit. By determining that the proposed role assignment does not conform to the security properties prior to implementation of the proposed role assignment, a compromise of the security of the resources may be avoided by not implementing the proposed role assignment.

Various approaches are described herein for, among other things, performing an action based on a pre-implementation determination as to whether a proposed role assignment associated with a dynamic role hierarchy conforms to security properties. A role assignment assigns a role to a principal (e.g., to a group of principals to which the principal belongs). Examples of a principal include but are not limited to a user, a group of users, and a computer program. The role defines a permission that enables the principal (e.g., each principal in the group) to perform an action with regard to a resource. Roles, including the role associated with the proposed role assignment, are hierarchically arranged in the dynamic role hierarchy. A dynamic role hierarchy is a role hierarchy in which one or more roles are changed, added, or deleted over time and/or for which assignment of one or more roles therein changes over time. For instance, a role may be changed by changing a permission, an action, and/or a resource associated with the role. An assignment of a role (i.e., a role assignment) may change by changing a principal or a group of principals to which the role is assigned. For instance, the group of principals may be changed by adding a principal to the group or deleting a principal from the group. A role hierarchy is a hierarchy in which multiple roles are arranged among multiple hierarchical levels. Each hierarchical level in the role hierarchy includes one or more of the roles. Each role that is encompassed by another role in a relatively higher hierarchical level of the dynamic role hierarchy inherits the permissions of the role that is included in the relatively higher hierarchical level. A security property indicates a constraint that is to be applied to role assignments. For instance, the security property may define a limit to which users are allowed to perform which actions with regard to which resources (e.g., in a designated circumstance) in order to maintain security of the resources.

In an example approach, role assignments that assign roles to principals are identified. The roles define permissions that enable the principals to which the roles are assigned to perform actions with regard to resources. The roles are included in a dynamic role hierarchy in which a subset of the roles that has a relatively lower rank in the dynamic role hierarchy inherits a permission from a subset of the roles that has a relatively higher rank in the dynamic role hierarchy. A proposed role assignment that proposes assignment of a designated role to a designated principal is identified. The designated role defines a designated permission that enables the designated principal to perform a designated action with regard to a designated resource. Impacted role assignments are selected from the role assignments based at least on the impacted role assignments corresponding to the designated role or another role in the dynamic role hierarchy that includes the designated role or that is included in the designated role and further based at least on the impacted role assignments corresponding to the designated resource or a resource that includes the designated resource or that is included in the designated resource. A static policy, which is defined by the impacted role assignments and the proposed role assignment, is generated. The static policy is converted into a first logical artifact. A specification and a relationship property are converted into a second logical artifact. The specification includes security properties that define boundaries of specified allowed actions and specified disallowed actions with regard to at least a subset of the resources such that the boundaries define constraints on the role assignments and the proposed role assignment. The relationship property defines a relationship between the specification and the static policy. Prior to implementation of the proposed role assignment, a determination is made whether the proposed role assignment conforms to the security properties in the specification by comparing the first logical artifact and the second logical artifact. Based at least on whether the proposed role assignment conforms to the security properties, an action is performed with regard to the proposed role assignment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 10 shows example semantics of a static policy in accordance with an embodiment.

Figure 1:
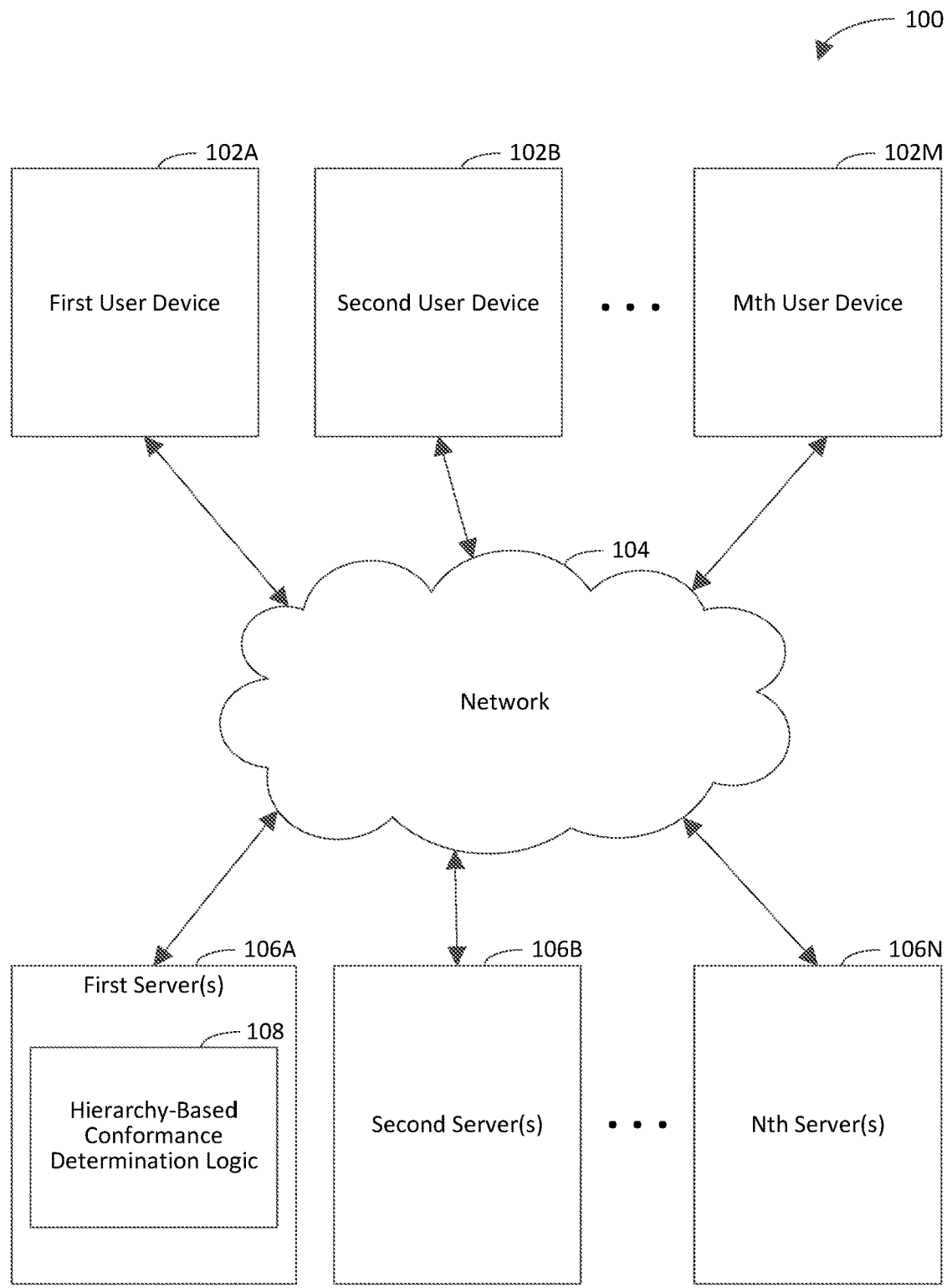
FIG. 1 is a block diagram of an example hierarchy-based conformance determination system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to determine whether a proposed role assignment conforms to security properties of a specification before implementation of the proposed role assignment. For instance, if the proposed role assignment does not conform to the security properties, implementation of the proposed role assignment may compromise security of resources, for example, by granting permissions regarding the resources that the security properties prohibit. By determining that the proposed role assignment does not conform to the security properties prior to implementation of the proposed role assignment, a compromise of the security of the resources may be avoided by not implementing the proposed role assignment.

Example embodiments described herein are capable of performing an action based on a pre-implementation determination as to whether a proposed role assignment associated with a dynamic role hierarchy conforms to security properties. A role assignment assigns a role to a principal (e.g., to a group of principals to which the principal belongs). Examples of a principal include but are not limited to a user, a group of users, and a computer program. The role defines a permission that enables the principal (e.g., each principal in the group) to perform an action with regard to a resource. Roles, including the role associated with the proposed role assignment, are hierarchically arranged in the dynamic role hierarchy. A dynamic role hierarchy is a role hierarchy in which one or more roles are changed, added, or deleted over time and/or for which assignment of one or more roles therein changes over time. For instance, a role may be changed by changing a permission, an action, and/or a resource associated with the role. An assignment of a role (i.e., a role assignment) may change by changing a principal or a group of principals to which the role is assigned. For instance, the group of principals may be changed by adding a principal to the group or deleting a principal from the group. A role hierarchy is a hierarchy in which multiple roles are arranged among multiple hierarchical levels. Each hierarchical level in the role hierarchy includes one or more of the roles. Each role that is encompassed by another role in a relatively higher hierarchical level of the dynamic role hierarchy inherits the permissions of the role that is included in the relatively higher hierarchical level. A security property indicates a constraint that is to be applied to role assignments. For instance, the security property may define a limit to which users are allowed to perform which actions with regard to which resources (e.g., in a designated circumstance) in order to maintain security of the resources.

Example techniques described herein have a variety of benefits as compared to conventional techniques for determining whether a role assignment violates security boundaries. In an aspect, the security boundaries are defined by security properties of a specification, which may be defined based on (e.g., based at least on) a threat model and/or best practices. The example techniques are capable of increasing security of resources or computing systems that host or access the resources. The example techniques may reduce a likelihood that a proposed role assignment that violates a security boundary is implemented. By determining that the proposed role assignment violates the security boundary, a remedial action may be performed proactively (e.g., prior to or in lieu of implementation of the proposed role assignment). For example, implementation of the proposed role assignment may be blocked; a notification may be generated to notify an entity (e.g., a security professional) that the proposed role assignment violates the security boundary; the proposed role assignment may be modified to conform to the security boundary prior to implementation, and so on.

Increasing security of the resources may include inhibiting (e.g., preventing) a malicious principal associated with the proposed role assignment from viewing the resources, deleting the resources, inserting information (e.g., code or data) into the resources, or changing values associated with the resources. By inhibiting the principal from inserting information into the resources, security of a computing system that hosts or accesses the resources may be increased. For instance, inhibiting the principal from inserting the information into the resources may inhibit the information from manipulating the computing system (e.g., a configuration thereof).

The example techniques may be capable of identifying whether a role assignment violates a security boundary more accurately, precisely, and/or reliably than conventional techniques. For instance, the example techniques may reduce a number of false positive identifications of role assignments violating security boundaries and/or increase a number of true positive identifications of role assignments violating security boundaries. By defining permissions as code rather than using static access matrix entries, the example techniques may be capable of managing access control at scale. By defining permissions as code, the example techniques may enable users to define expressive rules using various domain-specific languages that define constraints on the interaction between users, actions, and resources. The example techniques may enable an entity (e.g., an identity management program provider) to guarantee that role assignments that are implemented in a system do not violate security boundaries of the system.

The example techniques may reduce an amount of time and/or resources (e.g., processor cycles, memory, network bandwidth) that is consumed to determine whether a role assignment violates a security boundary. For example, by selecting role assignments that are impacted by a proposed role assignment for purposes of generating a static policy, which is analyzed against the security boundary to determine whether the proposed role assignment violates the security boundary, the scope of the analysis (and therefore the amount of time and/or resources consumed by a computing system to perform the analysis) may be reduced. For instance, operations that would have been performed with regard to the role assignments that are not impacted by the proposed role assignment may be avoided. Accordingly, the role assignments that are not impacted by the proposed role assignment may be ignored for purposes of the analysis. In another example, by comparing a first logical artifact, which represents the static policy, and a second logical artifact, which represents a specification that defines the security boundary, to determine whether the proposed role assignment violates the security property, the amount of time and/or resources that is consumed by the computing system to make the determination may be reduced. By reducing the amount of time and/or resources that is consumed by the computing system, the efficiency of the computing system may be increased and/or a cost associated with managing access control in a system (e.g., a networked system, such as an enterprise) may be reduced.

A user experience of an information technology (IT) professional who is tasked with managing role-based access control in a system may be increased, for example, by (1) limiting a number of role assignments that are analyzed by taking into consideration only those that are impacted by the proposed role assignment and/or (2) comparing logical artifacts associated with the static policy and the specification to determine whether the proposed role assignment violates the security boundary.

A user experience of an end user of a resource may be increased, for example, by determining that a proposed role assignment associated with a principal violates a security boundary (e.g., prior to or in lieu of implementation of the proposed role assignment). For instance, by making the determination, a reduction in the user experience of the end user as a result of the resource, a computing system that hosts the resource, and/or the end user's computing system being compromised based on the violation may be avoided.

FIG. 1 is a block diagram of an example hierarchy-based conformance determination system 100 in accordance with an embodiment. Generally speaking, the hierarchy-based conformance determination system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the hierarchy-based conformance determination system 100 performs an action based on a pre-implementation determination as to whether a proposed role assignment associated with a dynamic role hierarchy conforms to security properties. Detail regarding techniques for performing an action based on a pre-implementation determination as to whether a proposed role assignment associated with a dynamic role hierarchy conforms to security properties is provided in the following discussion.

As shown in FIG. 1, the hierarchy-based conformance determination system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the hierarchy-based conformance determination system 100.

One example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

Another example type of a computer program that may be executed by one or more of the servers 106A-106N is an identity management program (a.k.a. identity and access management program). An identity management program is a computer program that controls access of principals to resources (e.g., cloud-based resources). For instance, the identity management program may control which actions the principals are capable of performing with regard to the resources. Examples of an action that may be performed with regard to a resource include but are not limited to accessing the resource, opening the resource, modifying the resource (e.g., changing one or more attributes of the resource), and deleting the resource. Examples of an identity management program include but are not limited to Active Directory® identity management program developed and distributed by Microsoft Corporation; Auth0® identity management program developed and distributed by Okta, Inc.; Curity® identity management program developed and distributed by Curity I/O AB; Identity Anywhere™ identity management program developed and distributed by Avatier Corporation; Oracle Identity Governance™ identity management program developed and distributed by Oracle International Corporation; Polygraph® identity management program developed and distributed by Lacework, Inc.; and Salesforce® identity management program developed and distributed by Salesforce, Inc. It will be recognized that the example techniques described herein may be implemented using an identity management program.

The first server(s) 106A are shown to include hierarchy-based conformance determination logic 108 for illustrative purposes. The hierarchy-based conformance determination logic 108 is configured to identify role assignments that assign roles to principals. The roles define permissions that enable the principals to which the roles are assigned to perform actions with regard to resources. The roles are included in a dynamic role hierarchy in which a subset of the roles that has a relatively lower rank in the dynamic role hierarchy inherits a permission from a subset of the roles that has a relatively higher rank in the dynamic role hierarchy. The hierarchy-based conformance determination logic 108 is further configured to identify a proposed role assignment that proposes assignment of a designated role to a designated principal. The designated role defines a designated permission that enables the designated principal to perform a designated action with regard to a designated resource. The hierarchy-based conformance determination logic 108 is further configured to select impacted role assignments from the role assignments based at least on the impacted role assignments corresponding to the designated role or another role in the dynamic role hierarchy that includes the designated role or that is included in the designated role and further based at least on the impacted role assignments corresponding to the designated resource or a resource that includes the designated resource or that is included in the designated resource. The hierarchy-based conformance determination logic 108 is further configured to generate a static policy, which is defined by the impacted role assignments and the proposed role assignment. The hierarchy-based conformance determination logic 108 is further configured to convert the static policy into a first logical artifact. The hierarchy-based conformance determination logic 108 is further configured to convert a specification and a relationship property into a second logical artifact. The specification includes security properties that define boundaries of specified allowed actions and specified disallowed actions with regard to at least a subset of the resources such that the boundaries define constraints on the role assignments and the proposed role assignment. The relationship property defines a relationship between the specification and the static policy. The hierarchy-based conformance determination logic 108 is further configured to, prior to implementation of the proposed role assignment, determine whether the proposed role assignment conforms to the security properties in the specification by comparing the first logical artifact and the second logical artifact. The hierarchy-based conformance determination logic 108 is further configured to, based at least on whether the proposed role assignment conforms to the security properties, perform an action with regard to the proposed role assignment.

The hierarchy-based conformance determination logic 108 may be implemented in various ways to perform an action based on a pre-implementation determination as to whether a proposed role assignment associated with a dynamic role hierarchy conforms to security properties, including being implemented in hardware, software, firmware, or any combination thereof. For example, the hierarchy-based conformance determination logic 108 may be implemented as computer program code configured to be executed in one or more processors. In another example, at least a portion of the hierarchy-based conformance determination logic 108 may be implemented as hardware logic/electrical circuitry. For instance, at least a portion of the hierarchy-based conformance determination logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the hierarchy-based conformance determination logic 108 may be (or may be included in) an identity management system (e.g., a RBAC system), which includes the functionality of the identity management program described above, though the scope of the example embodiments is not limited in this respect. For instance, the hierarchy-based conformance determination logic 108 may be implemented as a proxy to the identity management system.

The hierarchy-based conformance determination logic 108 is shown to be incorporated in the first server(s) 106A for illustrative purposes and is not intended to be limiting. It will be recognized that the hierarchy-based conformance determination logic 108 (or any portion(s) thereof) may be incorporated in any one or more of the servers 106A-106N, any one or more of the user devices 102A-102M, or any combination thereof. For example, client-side aspects of the hierarchy-based conformance determination logic 108 may be incorporated in one or more of the user devices 102A-102M, and server-side aspects of hierarchy-based conformance determination logic 108 may be incorporated in one or more of the servers 106A-106N.

Figure 2A:
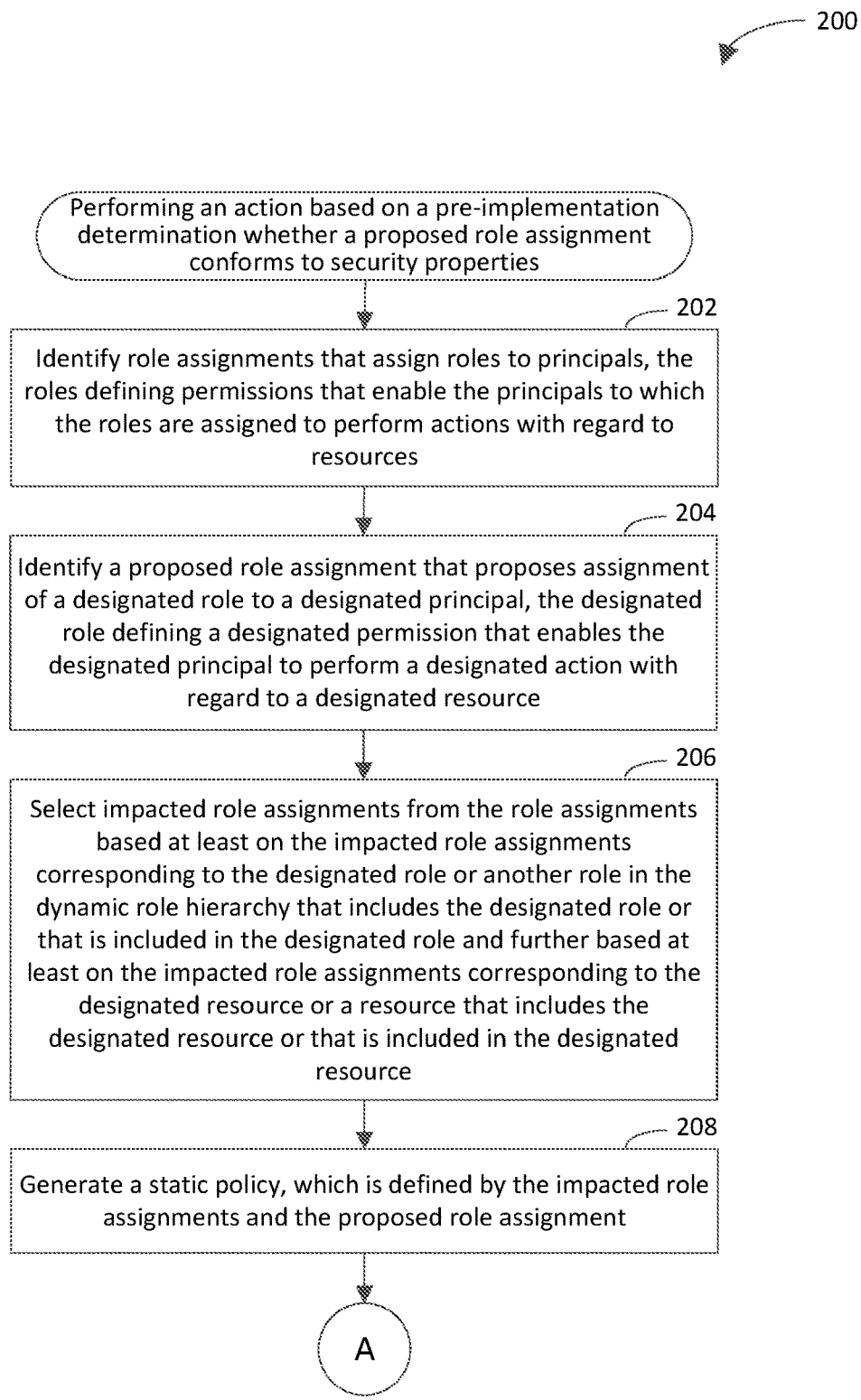
FIGS. 2A-2B depict respective portions of a flowchart of an example method for performing an action based on a pre-implementation determination whether a proposed role assignment conforms to security properties in accordance with an embodiment.
Figure 2B:
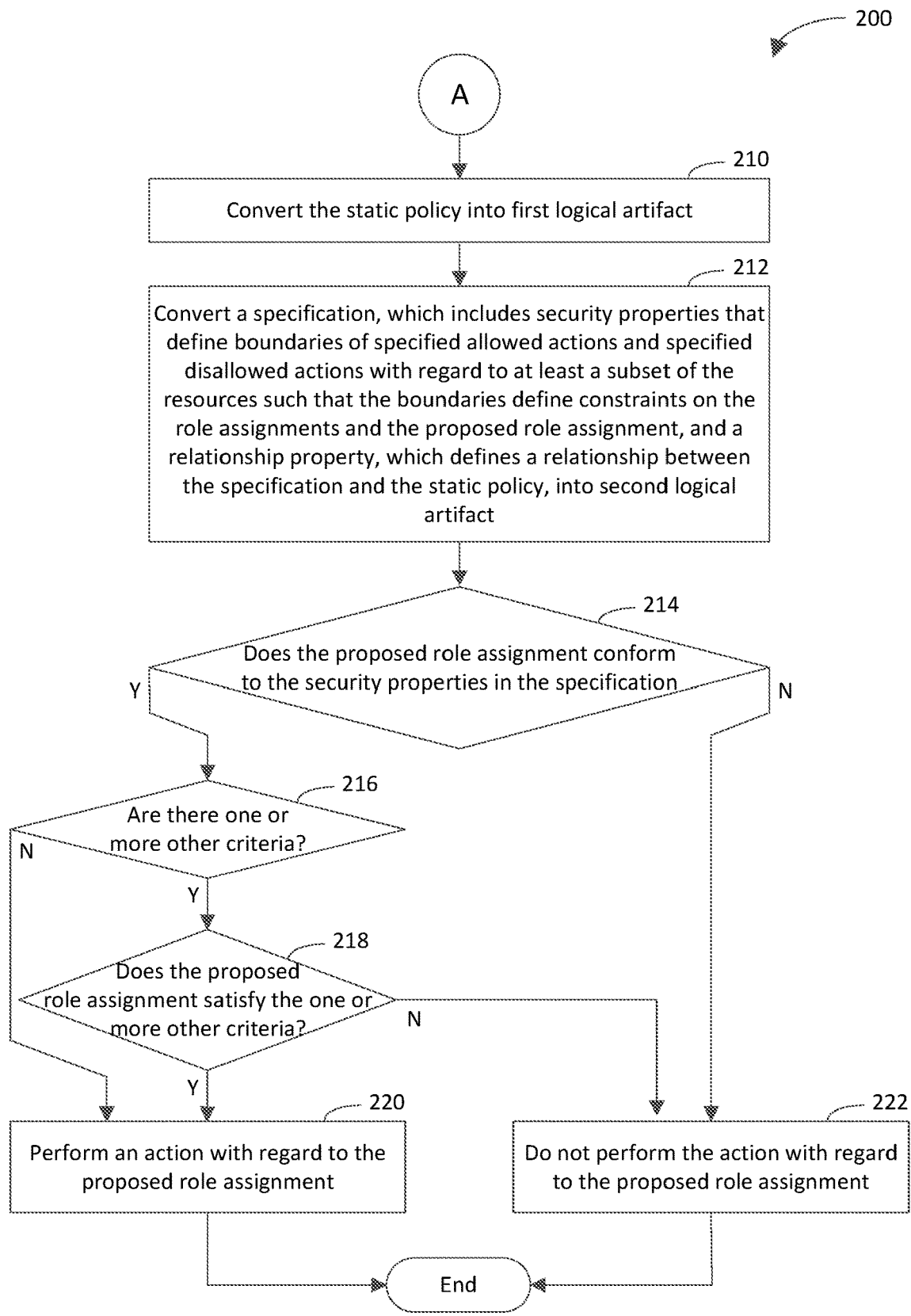
Figure 3:
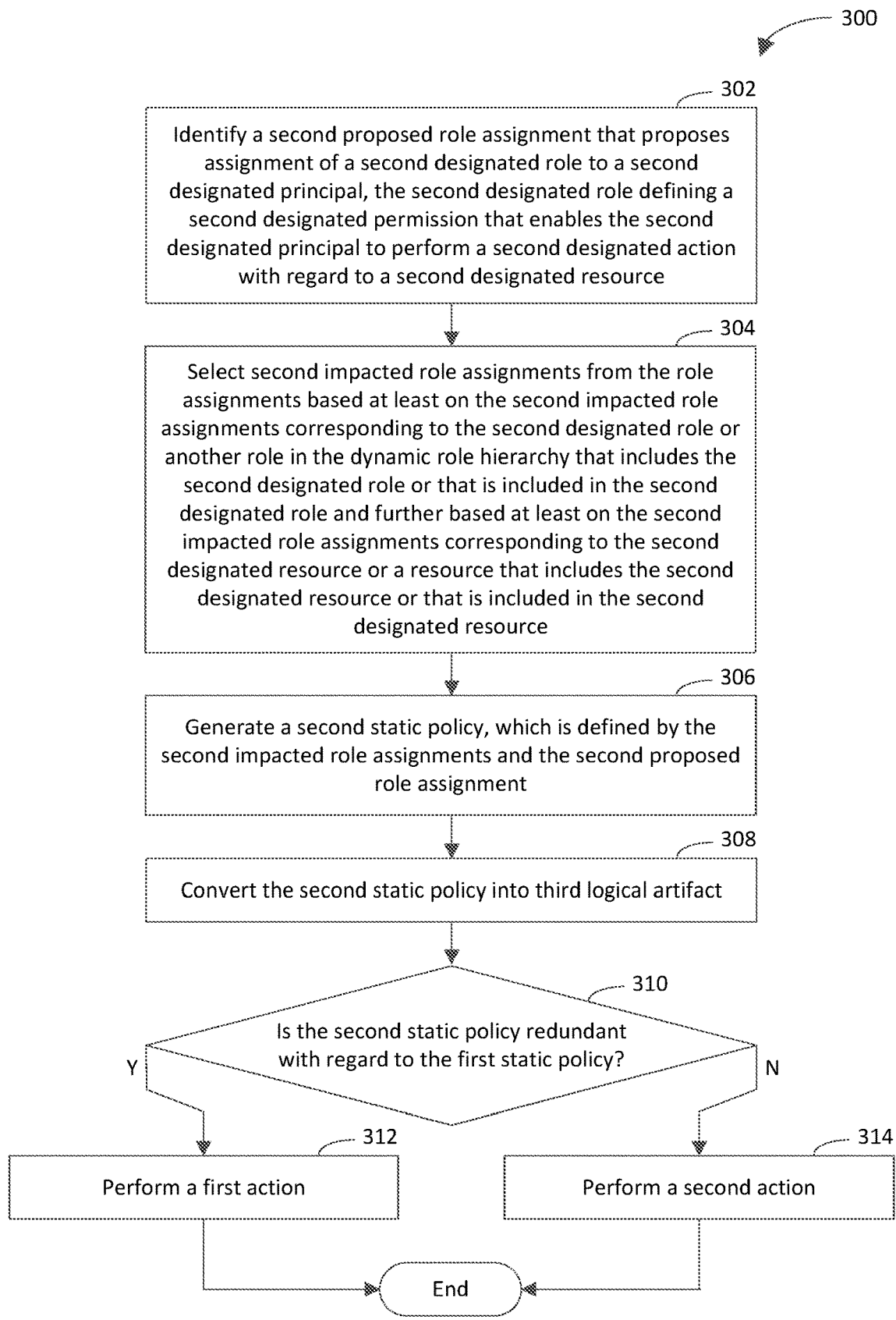
FIGS. 3-4 depict flowcharts of example methods for performing an action based on a pre-implementation determination whether a proposed role assignment conforms to security properties in accordance with embodiments.
Figure 4:
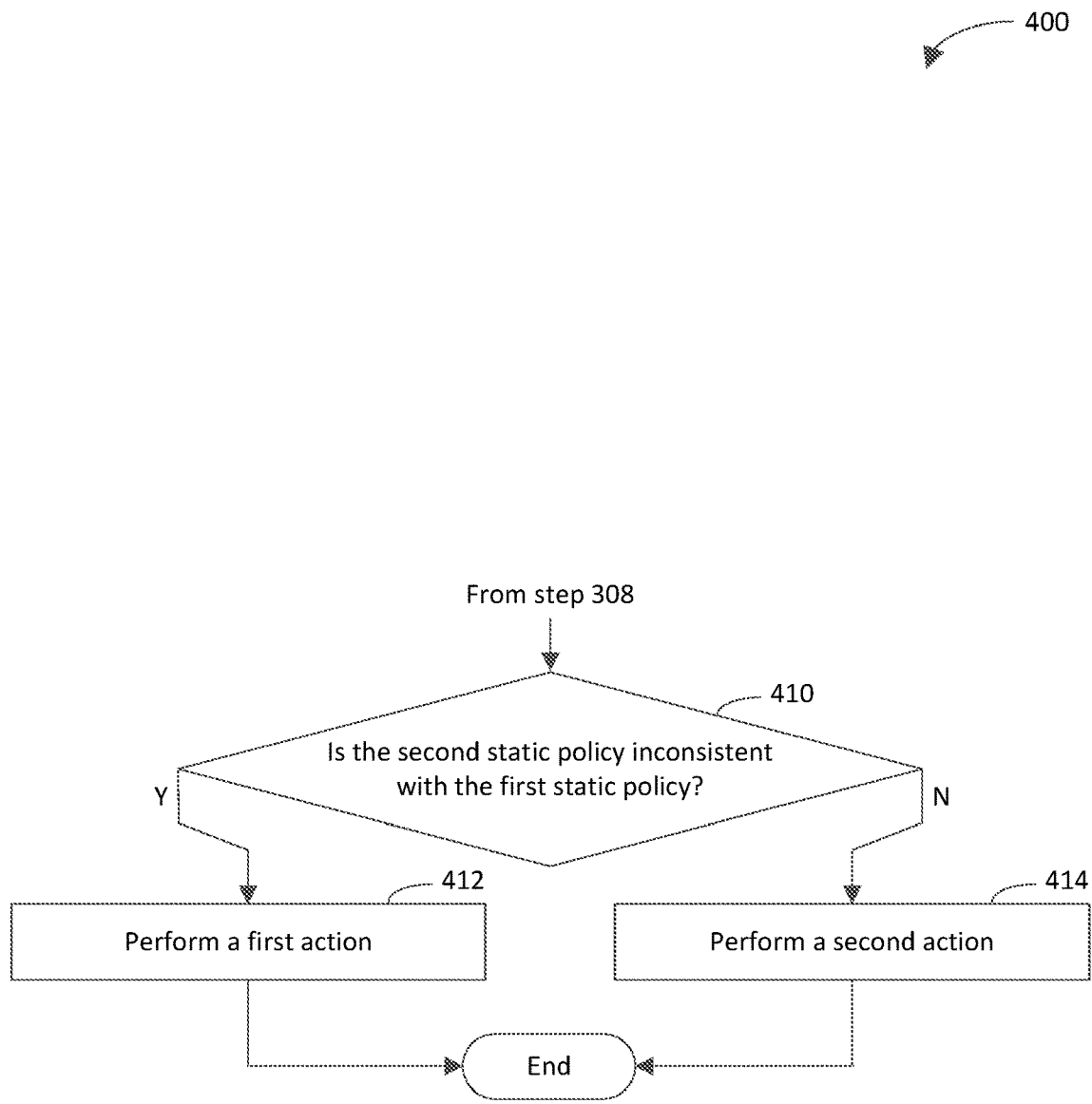
Figure 5:
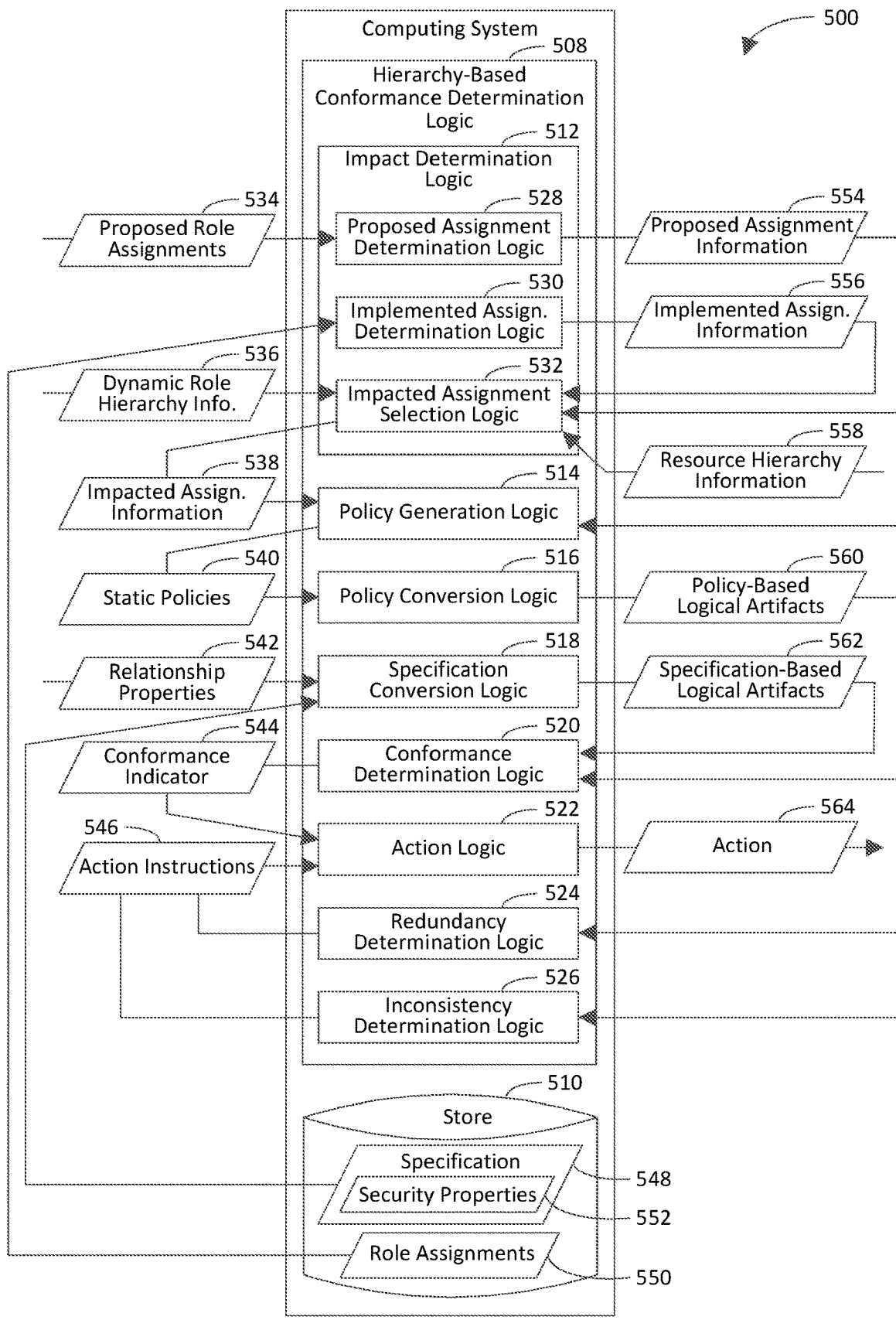
FIG. 5 is a block diagram of an example computing system in accordance with an embodiment.

FIGS. 2A-2B depict respective portions of a flowchart 200 of an example method for performing an action based on a pre-implementation determination whether a proposed role assignment conforms to security properties in accordance with an embodiment. FIGS. 3-4 depict flowcharts 300 and 400 of other example methods for performing an action based on a pre-implementation determination whether a proposed role assignment conforms to security properties in accordance with embodiments. Flowcharts 200, 300, and 400 may be performed by the first server(s) 106A shown in FIG. 1, for example. For illustrative purposes, flowcharts 200, 300, and 400 are described with respect to computing system 500 shown in FIG. 5, which is an example implementation of the first server(s) 106A. As shown in FIG. 5, the computing system 500 includes hierarchy-based conformance determination logic 508 and a store 510. The hierarchy-based conformance determination logic 308 includes impact determination logic 512, policy generation logic 514, policy conversion logic 516, specification conversion logic 518, conformance determination logic 520, action logic 522, redundancy determination logic 524, and inconsistency determination logic 526. The impact determination logic 512 includes proposed assignment determination logic 528, implemented assignment determination logic 530, and impacted assignment selection logic 532. The store 510 may be any suitable type of store. One type of store is a database. For instance, the store 510 may be a relational database, an entity-relationship database, an object database, an object relational database, an extensible markup language (XML) database, etc. The store 510 is shown to store a specification 548 and role assignments 550 for non-limiting, illustrative purposes. The specification 548 includes security properties 552. Further structural and operational embodiments will be apparent to persons skilled in the relevant art(s) based on the discussion regarding flowcharts 200, 300, and 400.

As shown in FIG. 2A, the method of flowchart 200 begins at step 202. In step 202, role assignments that assign roles to principals are identified. For example, the role assignments may assign respective subsets of the roles to respective subsets of the principals. In accordance with this example, a first role assignment may assign first role(s) to a first group of principals; a second role assignment may assign second role(s) to a second group of principals, and so on. The roles define permissions that enable the principals to which the roles are assigned to perform actions with regard to resources. The roles are included in a dynamic role hierarchy in which a subset of the roles that has a relatively lower rank in the dynamic role hierarchy inherits a permission from a subset of the roles that has a relatively higher rank in the dynamic role hierarchy. In an example implementation, implemented assignment determination logic 530 identifies the role assignments 550, which assign the roles to the principals. For instance, the implemented assignment determination logic 530 may retrieve the role assignments 550 from the store 510. In an aspect of this implementation, the role assignments 550 have been implemented (e.g., committed). For instance, the role assignments 550 may have been implemented prior to being identified. In another aspect of this implementation, each of the role assignments 550 cross-references a respective subset of the roles to a respective subset of the principals. In accordance with this aspect, each role cross-references a respective subset of the permissions to a respective subset of the resources. Each subset of the roles includes one or more of the roles. Each subset of the principals includes one or more of the principals. Each subset of the permissions includes one or more of the permissions. Each subset of the resources includes one or more of the resources. The implemented assignment determination logic 530 generates implemented assignment information 556, which indicates (e.g., specifies) the role assignments 550.

At step 204, a proposed role assignment that proposes assignment of a designated role to a designated principal is identified. The designated role defines a designated permission that enables the designated principal to perform a designated action with regard to a designated resource. In an example implementation, the proposed assignment determination logic 528 identifies the proposed role assignment. For instance, the proposed role assignment may be included among proposed role assignments 534 that are received by the proposed assignment determination logic 528. In an aspect of this implementation, the proposed role assignment cross-references designated role to the designated principal. In accordance with this aspect, the designated role cross-references the designated permission to the designated resource. The proposed assignment determination logic 528 generates proposed assignment information 554, which indicates (e.g., specifies) the proposed role assignment.

At step 206, impacted role assignments are selected from the role assignments based at least on the impacted role assignments corresponding to the designated role or another role in the dynamic role hierarchy that includes the designated role or that is included in the designated role and further based at least on the impacted role assignments corresponding to the designated resource or a resource that includes the designated resource or that is included in the designated resource.

In an example implementation, the impacted assignment selection logic 532 selects the impacted role assignments from the role assignments 550. In an aspect of this implementation, the impacted assignment selection logic 532 analyzes dynamic role hierarchy information 536, which indicates hierarchical levels of the dynamic role hierarchy and subsets of the roles that are included in the respective hierarchical levels, to identify the designated role, as indicated by the proposed assignment information 554, in the dynamic role hierarchy, to identify each role of the dynamic role hierarchy that includes the designated role, and to identify each role of the dynamic role hierarchy that the designated role includes. In accordance with this aspect, the impacted assignment selection logic 532 defines a set of impacted roles to include the designated role, each role of the dynamic role hierarchy that includes the designated role, and each role of the dynamic role hierarchy that the designated role includes. It will be recognized that the set of impacted roles may include any suitable number of roles (e.g., 1, 2, 3, 58, or 923).

In another aspect of this implementation, the impacted assignment selection logic 532 analyzes resource hierarchy information 558, which indicates hierarchical levels of a resource hierarchy and subsets of the resources that are included in the respective hierarchical levels, to identify the designated resource, as indicated by the proposed assignment information 554, in the resource hierarchy, to identify each resource of the resource hierarchy that includes the designated resource, and to identify each resource of the resource hierarchy that the designated resource includes. In accordance with this aspect, the impacted assignment selection logic 532 defines a set of impacted resources to include the designated resource, each resource of the resource hierarchy that includes the designated resource, and each resource of the resource hierarchy that the designated resource includes. It will be recognized that the set of impacted resources may include any suitable number of resources (e.g., 1, 2, 3, 44, or 789).

In yet another aspect of this implementation, the impacted assignment selection logic 532 analyzes the implemented assignment information 556 to identify the role(s) corresponding to each of the role assignments 550 and the resource(s) corresponding to each role. In accordance with this aspect, the impacted assignment selection logic 532 defines the impacted role assignments to include each of the role assignments 550 that corresponds to a role that is included in the set of impacted roles and/or that corresponds to a resource that is included in the set of impacted resources. For instance, the impacted assignment selection logic 532 may define the impacted role assignments to exclude each of the role assignments 550 that does not correspond to a role that is included in the set of impacted roles and that does not correspond to a resource that is included in the set of impacted resources. The impacted assignment selection logic 532 generates impacted assignment information 538 to indicate the impacted role assignments.

At step 208, a static policy, which is defined by the impacted role assignments and the proposed role assignment, is generated. Accordingly, the static policy may be generated based on the impacted role assignments and the proposed role assignment. In an aspect, the static policy is not based on the role assignments that are not included in the impacted role assignments. In another aspect, the static policy describes a combination of the impacted role assignments and the proposed role assignment. For instance, the static policy may define a scope (e.g., boundary) of the combination. In yet another aspect, the static policy represents the combination of the impacted role assignments and the proposed role assignment in normal (a.k.a. canonical) form. In an example implementation, the policy generation logic 514 generates the static policy based on the impacted role assignments, as indicated by the impacted assignment information 538, and the proposed role assignment, as indicated by the proposed assignment information 554. For instance, the policy generation logic 514 may generate static policies 540 to include the static policy. Upon completion of step 208, flow continues at step 210 shown in FIG. 2B. It will be recognized that step 208 need not necessarily be completed prior to initiation or performance of step 210.

At step 210, the static policy is converted into a first logical artifact. In an aspect, the first logical artifact defines semantics of the static policy. An artifact may be described as something that is produced or that is found by a process, though the example embodiments are not limited in this respect. Examples of an artifact include but are not limited to a file, a data structure, and a set of logical formulas (e.g., a set of logical sentences). For example, an artifact may be a set of logical formulas with no unbound variables. A logical formula may be a formula that is written in the language of logic (e.g., first order logic or classical first order logic). In an example implementation, the policy conversion logic 516 converts the static policy into the first logical artifact. The policy conversion logic 516 may generate policy-based logical artifacts 560 to include the first logical artifact.

At step 212, a specification and a relationship property are converted into a second logical artifact. In an aspect, the second logical artifact defines semantics of the specification and the relationship property. The specification includes security properties (e.g., organization-defined security properties) that define (e.g., explicitly define) boundaries of specified allowed actions and specified disallowed actions with regard to at least a subset of the resources such that the boundaries define constraints on the role assignments and the proposed role assignment. In an aspect, all possible actions are included among the specified allowed actions and the specified disallowed actions. Any one or more of the security properties may be derived from a best practice or a threat model, though the scope of the example embodiments is not limited in this respect. For instance, the best practice or the threat model may be associated with an organization or an enterprise. The relationship property defines a relationship between the specification and the static policy. For example, the relationship may indicate an implication or a negation. In accordance with this example, the implication may be that the specification is less than (e.g., is encompassed by) the static policy or that the static policy is less than the specification. In further accordance with this example, the negation may be that the specification and the static policy are disjoint (e.g., mutually exclusive). In an example implementation, the specification conversion logic 518 converts the specification 548 and the relationship property, which is included among relationship properties

542, into the second logical artifact. In accordance with this implementation, the specification 548 includes the security properties 552, which define the boundaries of the specified allowed actions and the specified disallowed actions with regard to at least a subset of the resources. In further accordance with this implementation, the relationship property defines a relationship between the specification 548 and the static policy. The specification conversion logic 518 may generate specification-based logical artifacts 562 to include the second logical artifact.

At step 214, a determination is made whether the proposed role assignment conforms to the security properties in the specification by comparing the first logical artifact and the second logical artifact. For instance, the determination may be made prior to implementation of the proposed role assignment. In an example implementation, the conformance determination logic 520 determines whether the proposed role assignment conforms to the security properties 552 in the specification 548 by comparing the first logical artifact, which is included among the policy-based logical artifacts 560, and the second logical artifact, which is included among the specification-based logical artifacts 562. In an aspect, the conformance determination logic 520 makes the determination by comparing the static policy, as represented by the first logical artifact, to the boundaries that are defined by the security properties, as represented by the second logical artifact. In accordance with this aspect, the proposed role assignment is deemed to conform to a security property based on the static policy not violating (e.g., not exceeding) a boundary that is defined by the security property. For instance, the proposed role assignment may be deemed to conform to the security property if and only if the static policy does not violate the boundary. In further accordance with this aspect, the proposed role assignment is deemed to not conform to a security property based on the static policy violating (e.g., exceeding) a boundary that is defined by the security property. For instance, the proposed role assignment may be deemed to not conform to the security property if and only if the static policy violates the boundary. The conformance determination logic 520 generates a conformance indicator 544 having a value that depends at least in part on whether the proposed role assignment conforms to the security properties 552 in the specification 548. In an aspect, the conformance determination logic 520 is configured to cause the conformance indicator 544 to have a first value based at least on the proposed role assignment conforming to the security properties 552 in the specification 548. In accordance with this aspect, the conformance determination logic 520 is configured to cause the conformance indicator 544 to have a second value, which is different from the first value, based at least on the proposed role assignment not conforming to the security properties 552 in the specification 548. If the proposed role assignment conforms to the security properties in the specification at step 214, flow continues to step 216. Otherwise, flow continues to step 222.

In an example embodiment, determining whether the proposed role assignment conforms to the security properties in the specification at step 214 includes comparing the first logical artifact and the second logical artifact in accordance with a satisfiability modulo theories (SMT) technique. An SMT technique is a technique in which a determination is made whether a mathematical formula is satisfiable. For instance, the SMT technique may generalize the Boolean satisfiability problem to relatively complex formulas. The relatively complex formulas may involve real numbers, integers, and/or data structures such as lists, arrays, bit vectors, and strings.

At step 216, a determination is made whether there are one or more other criteria. In an example implementation, the conformance determination logic 520 determines whether there are one or more other criteria. If there are one or more other criteria, flow continues to step 218. Otherwise, flow continues to step 220.

At step 218, a determination is made whether the proposed role assignment satisfies the one or more other criteria. In an example implementation, the conformance determination logic 520 determines whether the proposed role assignment satisfies the one or more other criteria. In accordance with this implementation, the conformance determination logic 520 is configured to cause the conformance indicator 544 to have the first value based at least on the proposed role assignment satisfying the one or more other criteria in addition to the proposed role assignment conforming to the security properties 552 in the specification 548. In further accordance with this aspect, the conformance determination logic 520 is configured to cause the conformance indicator 544 to have the second value based at least on the proposed role assignment not satisfying the one or more other criteria, even though the proposed role assignment conforms to the security properties 552 in the specification 548. If the proposed role assignment satisfies the one or more other criteria, flow continues to step 220. Otherwise, flow continues to step 222.

At step 220, an action is performed with regard to the proposed role assignment. For example, performing the action at step 220 may include implementing the proposed role assignment. In an example implementation, the action logic 522 performs an action 564 with regard to the proposed role assignment based on the conformance indicator 544 (e.g., based on the conformance indicator 544 having the first value).

At step 222, an action is not performed with regard to the proposed role assignment. For example, not performing the action at step 222 may include not implementing the proposed role assignment (e.g., disregarding the proposed role assignment). In another example, not performing the action at step 222 may include performing a different action, in lieu of the action, with regard to the proposed role assignment. For instance, the different action may be a remedial action that addresses a security risk that results from the proposed role assignment not conforming to at least one of the security properties. In yet another example, not performing the action at step 222 may include performing no action with regard to the proposed role assignment. In an example implementation, the action logic 522 does not perform the action 564 with regard to the proposed role assignment based on the conformance indicator 544 (e.g., based on the conformance indicator 544 having the second value).

In an example embodiment, determining whether the proposed role assignment conforms to the security properties at step 214 includes determining whether a scope of the static policy contains a scope of the security properties that define the boundaries of the specified allowed actions by comparing the first logical artifact and the second logical artifact. In accordance with this embodiment, the scope of the static policy containing the scope of the security properties that define the boundaries of the specified allowed actions indicates that the proposed role assignment conforms to the security properties in the specification. In further accordance with this embodiment, the scope of the static policy not containing the scope of the security properties that define the boundaries of the specified allowed actions indicates that the proposed role assignment does not conform to the security properties in the specification. In a first aspect of this embodiment, the action is performed with regard to the proposed role assignment at step 220 based at least on the scope of the static policy containing the scope of the security properties that define the boundaries of the specified allowed actions and further based at least on the proposed role assignment satisfying the one or more other criteria. In a second aspect of this embodiment, the action is not performed with regard to the proposed role assignment at step 222 based at least on the scope of the static policy not containing the scope of the security properties that define the boundaries of the specified allowed actions. In a third aspect of this embodiment, the action is not performed with regard to the proposed role assignment at step 222 based at least on the proposed role assignment not satisfying the one or more other criteria, even though the scope of the static policy contains the scope of the security properties that define the boundaries of the specified allowed actions.

In another example embodiment, determining whether the proposed role assignment conforms to the security properties at step 214 includes determining whether a scope of the static policy overlaps with a scope of the security properties that define the boundaries of the specified disallowed actions by comparing the first logical artifact and the second logical artifact. In accordance with this embodiment, the scope of the static policy not overlapping with the scope of the security properties that define the boundaries of the specified disallowed actions indicates that the proposed role assignment conforms to the security properties in the specification. In further accordance with this embodiment, the scope of the static policy overlapping with the scope of the security properties that define the boundaries of the specified disallowed actions indicates that the proposed role assignment does not conform to the security properties in the specification. In a first aspect of this embodiment, the action is performed with regard to the proposed role assignment at step 220 based at least on the scope of the static policy not overlapping with the scope of the security properties that define the boundaries of the specified disallowed actions and further based at least on the proposed role assignment satisfying the one or more other criteria. In a second aspect of this embodiment, the action is not performed with regard to the proposed role assignment at step 222 based at least on the scope of the static policy overlapping with the scope of the security properties that define the boundaries of the specified disallowed actions. In a third aspect of this embodiment, the action is not performed with regard to the proposed role assignment at step 222 based at least on the proposed role assignment not satisfying the one or more other criteria, even though the scope of the static policy does not overlap with the scope of the security properties that define the boundaries of the specified disallowed actions.

In some example embodiments, one or more steps 202, 204, 206, 208, 210, 212, 214, 216, 218, 220, and/or 222 of flowchart 200 may not be performed. Moreover, steps in addition to or in lieu of steps 202, 204, 206, 208, 210, 212, 214, 216, 218, 220, and/or 222 may be performed. For instance, in an example embodiment, the method of flowchart 200 further includes converting a second specification and a second relationship property into third logical artifact. The second specification includes second security properties that define second boundaries of second specified allowed actions and second specified disallowed actions with regard to at least a second subset of the resources such that the second boundaries define second constraints on the role assignments and the proposed role assignment. The second relationship property defines a relationship between the second specification and the static policy. In an example implementation, the specification conversion logic 518 converts the second specification and the second relationship property into the third logical artifact. For instance, the second specification may be retrieved from the store 510. The second relationship property may be included among the relationship properties 542. The third logical artifact may be included among the specification-based logical artifacts 562.

In accordance with this embodiment, determining whether there are one or more other criteria at step 216 includes determining that a criterion requires the proposed role assignment to conform to the second security properties in the second specification. In an example implementation, the conformance determination logic 520 determines that the criterion requires the proposed role assignment to conform to the second security properties in the second specification.

In further accordance with this embodiment, determining whether the proposed role assignment satisfies the one or more other criteria at step 218 includes determining whether the proposed role assignment conforms to the second security properties in the second specification by comparing the first logical artifact and the third logical artifact. In an example implementation, the conformance determination logic 520 determines whether the proposed role assignment conforms to the second security properties in the second specification by comparing the first logical artifact, which is included among the policy-based logical artifacts 560, and the third logical artifact, which is included among the specification-based logical artifacts 562. In an aspect, the conformance determination logic 520 makes the determination by comparing the static policy, as represented by the first logical artifact, to the second boundaries that are defined by the second security properties, as represented by the third logical artifact. In accordance with this aspect, the proposed role assignment is deemed to conform to a second security property based on the static policy not violating (e.g., not exceeding) a second boundary that is defined by the second security property. For instance, the proposed role assignment may be deemed to conform to the second security property if and only if the static policy does not violate the second boundary. In further accordance with this aspect, the proposed role assignment is deemed to not conform to a second security property based on the static policy violating (e.g., exceeding) a second boundary that is defined by the second security property. For instance, the proposed role assignment may be deemed to not conform to the second security property if and only if the static policy violates the second boundary. The conformance determination logic 520 configures the conformance indicator 544 to indicate whether the proposed role assignment conforms to the second security properties in the second specification. In an aspect, the conformance determination logic 520 is configured to cause the conformance indicator 544 to have the first value based at least on the proposed role assignment conforming to the second security properties in the second specification. In accordance with this aspect, the conformance determination logic 520 is configured to cause the conformance indicator 544 to have the second value based at least on the proposed role assignment not conforming to the second security properties in the second specification.

In an aspect of this embodiment, if the proposed role assignment conforms to the second security properties in the second specification, flow continues to step 220. Otherwise, flow continues to step 222. In accordance with this aspect, performing the action with regard to the role assignment at step 220 is based at least on the proposed role assignment conforming to the security properties and further based at least on the proposed role assignment conforming to the second security properties. In further accordance with this embodiment, not performing the action with regard to the role assignment at step 222 is based at least on the proposed role assignment not conforming to the security properties and/or the proposed role assignment not conforming to the second security properties.

In another example embodiment, the method of flowchart 200 further includes one or more of the steps shown in flowchart 300 of FIG. 3. As shown in FIG. 3, the method of flowchart 300 begins at step 302. In step 302, a second proposed role assignment that proposes assignment of a second designated role to a second designated principal is identified. The second designated role defines a second designated permission that enables the second designated principal to perform a second designated action with regard to a second designated resource. In an example implementation, the proposed assignment determination logic 528 identifies the second proposed role assignment. For instance, the second proposed role assignment may be included among the proposed role assignments 534, which are received by the proposed assignment determination logic 528. In accordance with this implementation, the proposed assignment determination logic 528 configures the proposed assignment information 554 to indicate the second proposed role assignment.

At step 304, second impacted role assignments are selected from the role assignments based at least on the second impacted role assignments corresponding to the second designated role or another role in the dynamic role hierarchy that includes the second designated role or that is included in the second designated role and further based at least on the second impacted role assignments corresponding to the second designated resource or a resource that includes the second designated resource or that is included in the second designated resource. In an example implementation, the impacted assignment selection logic 532 selects the second impacted role assignments from the role assignments 550. In an aspect of this implementation, the impacted assignment selection logic 532 analyzes the dynamic role hierarchy information 536 to identify the second designated role, as indicated by the proposed assignment information 554, in the dynamic role hierarchy, to identify each role of the dynamic role hierarchy that includes the second designated role, and to identify each role of the dynamic role hierarchy that the second designated role includes. In accordance with this aspect, the impacted assignment selection logic 532 defines a second set of impacted roles to include the second designated role, each role of the dynamic role hierarchy that includes the second designated role, and each role of the dynamic role hierarchy that the second designated role includes. The impacted assignment selection logic 532 configures the impacted assignment information 538 to indicate the second impacted role assignments.

At step 306, a second static policy, which is defined by the second impacted role assignments and the second proposed role assignment, is generated. Accordingly, the second static policy may be generated based on the second impacted role assignments and the second proposed role assignment. In an aspect, the second static policy is not based on the role assignments that are not included in the second impacted role assignments. In another aspect, the second static policy describes a combination of the second impacted role assignments and the second proposed role assignment. For instance, the second static policy may define a scope (e.g., boundary) of the combination. In yet another aspect, the second static policy represents the combination of the second impacted role assignments and the second proposed role assignment in normal (a.k.a. canonical) form. In an example implementation, the policy generation logic 514 generates the second static policy based on the second impacted role assignments, as indicated by the impacted assignment information 538, and the second proposed role assignment, as indicated by the proposed assignment information 554. For instance, the policy generation logic 514 may provide the second static policy in the static policies 540.

In an example embodiment, the boundaries of the specified allowed actions and the specified disallowed actions, which are defined by the security properties of the specification, define the constraints on the role assignments, the constraints on the proposed role assignment, and constraints on the second proposed role assignment.

At step 308, the second static policy is converted into third logical artifact. In an aspect, the third logical artifact defines semantics of the second static policy. In an example implementation, the policy conversion logic 516 converts the second static policy into the third logical artifact. The policy conversion logic 516 may provide the third logical artifact among the policy-based logical artifacts 560.

At step 310, a determination is made whether the second static policy is redundant with regard to the first static policy, based at least on whether application of a Boolean AND operation to the first static policy and the second static policy results in the second static policy, by comparing the first logical artifact and the third logical artifact. Application of the Boolean AND operation to the first static policy and the second static policy resulting in the second static policy indicates that the second static policy is redundant. Application of the Boolean AND operation to the first static policy and the second static policy not resulting in the second static policy indicates that the second static policy is not redundant. In an example implementation, the redundancy determination logic 524 determines whether the second static policy is redundant with regard to the first static policy. The redundancy determination logic 524 generates an action instruction 546, which indicates an action that is to be performed by the action logic 522. The action is selected based on whether the second static policy is redundant with regard to the first static policy. In an aspect, the redundancy determination logic 524 is configured to cause the action instruction 546 to instruct the action logic 522 to perform a first action based on the second static policy being redundant with regard to the first static policy. In another aspect, the redundancy determination logic 524 is configured to cause the action instruction 546 to instruct the action logic 522 to perform a second action based on the second static policy not being redundant with regard to the first static policy. If the second static policy is redundant with regard to the first static policy, flow continues to step 312. Otherwise, flow continues to step 314.

At step 312, the first action is performed. For instance, performing the first action may include ignoring or discarding the second proposed role assignment. In an example implementation, the action logic 522 performs the first action (e.g., with regard to the second proposed role assignment) based on the action instruction 546 (e.g., based on the action instruction 546 instructing the action logic 522 to perform the first action).

At step 314, the second action is performed. In an example implementation, the action logic 522 performs the second action (e.g., with regard to the second proposed role assignment) based on the action instruction 546 (e.g., based on the action instruction 546 instructing the action logic 522 to perform the second action).

In an aspect of this embodiment, steps 310, 312, and 314 in FIG. 3 are replaced with the steps shown in flowchart 400 of FIG. 4. As shown in FIG. 4, the method of flowchart 400 begins at step 410. In step 410, a determination is made whether the second static policy is inconsistent with the first static policy, based at least on whether application of a Boolean AND operation to the first static policy and the second static policy results in an empty set, by comparing the first logical artifact and the third logical artifact. Application of the Boolean AND operation to the first static policy and the second static policy resulting in the empty set indicates that the second static policy is inconsistent with the first static policy. Application of the Boolean AND operation to the first static policy and the second static policy not resulting in the empty set indicates that the second static policy is not inconsistent with the first static policy. In an example implementation, the inconsistency determination logic 526 determines whether the second static policy is inconsistent with the first static policy. The inconsistency determination logic 526 generates an action instruction 546, which indicates an action that is to be performed by the action logic 522. The action is selected based on whether the second static policy is inconsistent with the first static policy. In an aspect, the inconsistency determination logic 526 is configured to cause the action instruction 546 to instruct the action logic 522 to perform a first action based on the second static policy being inconsistent with the first static policy. In another aspect, the inconsistency determination logic 526 is configured to cause the action instruction 546 to instruct the action logic 522 to perform a second action based on the second static policy not being inconsistent with the first static policy. If the second static policy is inconsistent with the first static policy, flow continues to step 412. Otherwise, flow continues to step 414.

At step 412, the first action is performed. For instance, performing the first action may include providing a notification, indicating that the second static policy is inconsistent with the first static policy. In an example implementation, the action logic 522 performs the first action (e.g., with regard to the second proposed role assignment) based on the action instruction 546 (e.g., based on the action instruction 546 instructing the action logic 522 to perform the first action).

At step 414, the second action is performed. In an example implementation, the action logic 522 performs the second action (e.g., with regard to the second proposed role assignment) based on the action instruction 546 (e.g., based on the action instruction 546 instructing the action logic 522 to perform the second action).

It will be recognized that the computing system 500 may not include one or more of the hierarchy-based conformance determination logic 508, the store 510, the impact determination logic 512, the policy generation logic 514, the policy conversion logic 516, the specification conversion logic 518, the conformance determination logic 520, the action logic 522, the redundancy determination logic 524, the inconsistency determination logic 526, the proposed assignment determination logic 528, the implemented assignment determination logic 530, and/or the impacted assignment selection logic 532. Furthermore, the computing system 500 may include components in addition to or in lieu of the hierarchy-based conformance determination logic 508, the store 510, the impact determination logic 512, the policy generation logic 514, the policy conversion logic 516, the specification conversion logic 518, the conformance determination logic 520, the action logic 522, the redundancy determination logic 524, the inconsistency determination logic 526, the proposed assignment determination logic 528, the implemented assignment determination logic 530, and/or the impacted assignment selection logic 532.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Figure 6:
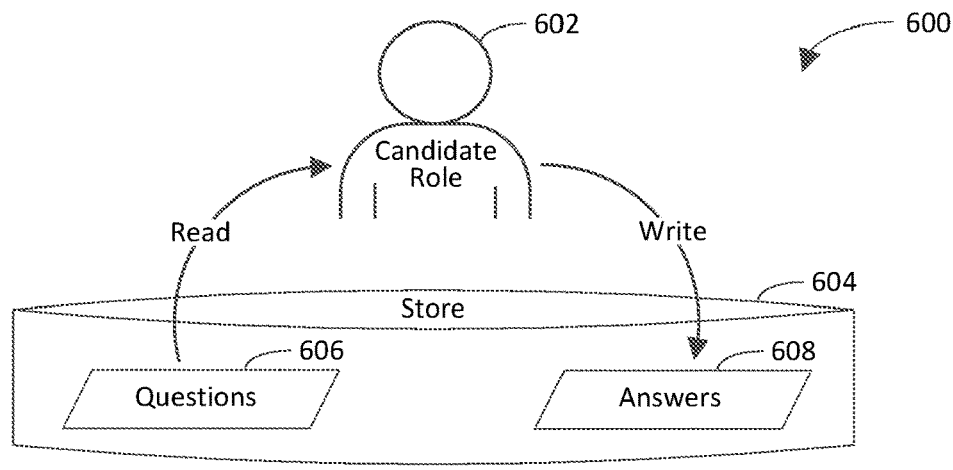
FIG. 6 illustrates an example candidate role assignment in accordance with an embodiment.
Figure 7:
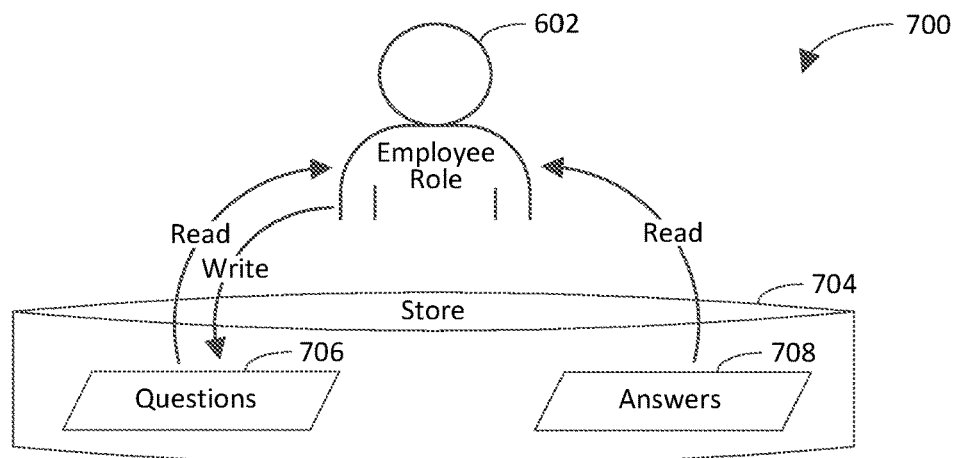
FIG. 7 illustrates an example employee role assignment in accordance with an embodiment.
Figure 8:
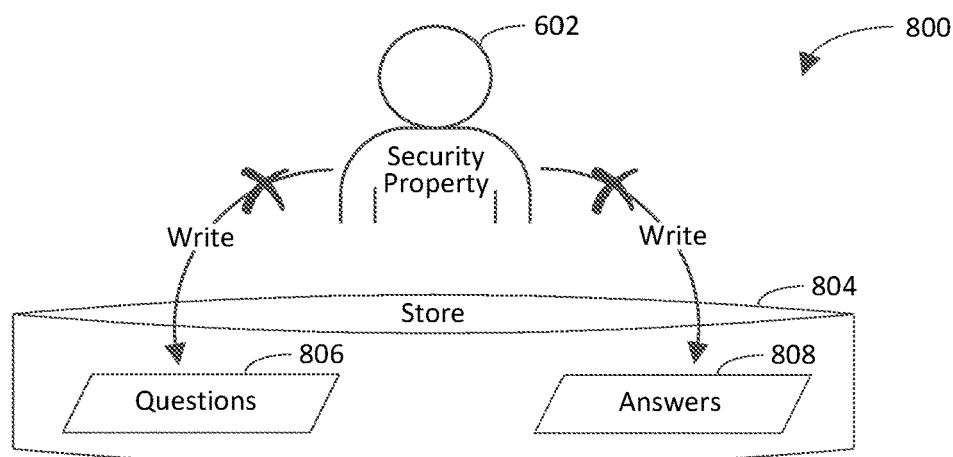
FIG. 8 illustrates an example security boundary in accordance with an embodiment.

FIGS. 6-8 demonstrate application of an example technique described herein to an interviewing scenario. FIG. 6 illustrates an example candidate role assignment 600 in accordance with an embodiment. As shown in FIG. 6, a candidate role is assigned to a principal 602. For instance, the principal 602 may be a job candidate. The candidate role enables any principals to which the candidate role is assigned, including the principal 602, to read questions 606 and write answers 608 to the questions 606. The questions 606 and the answers 608 are shown to be stored in a store 604 for illustrative purposes.

FIG. 7 illustrates an example employee role assignment 700 in accordance with an embodiment. As shown in FIG. 7, an employee role is assigned to the principal 602. The employee role enables any principals to which the employee role is assigned, including the principal 602, to write questions 706 for candidates, to read the questions 706, and to read answers 708 that the candidates provide in response to the questions 706. For instance, the questions 706 and the answers 708 may include the questions 606 and the answers 608, respectively, that are shown in FIG. 6. The questions 706 and the answers 708 are shown to be stored in a store 704 for illustrative purposes.

FIG. 8 illustrates an example security boundary 800 in accordance with an embodiment. The security boundary 800 is defined by a security property. The security boundary 800 disallows any principal, such as principal 602, to both write questions 806 for candidates and write answers 808 in response to the questions 806. Thus, if both the candidate role described above with regard to FIG. 6 and the employee role described above with regard to FIG. 7 are assigned to the principal 602, the principal will be able to both write the questions 806 and write the answers 808 in violation of the security property. In a first example, if a proposed role assignment proposes to assign the employee role to the principal 602 while the candidate role is assigned to the principal 602, implementing an example technique described herein enables a determination that the proposed role assignment does not conform to the security property. In a second example, if a proposed role assignment proposes to assign the candidate role to the principal 602 while the employee role is assigned to the principal 602, implementing an example technique described herein enables a determination that the proposed role assignment does not conform to the security property. The questions 806 and the answers 808 are shown to be stored in a store 804 for illustrative purposes. In an aspect, assignment of both the candidate role and the employee role to the principal 602 is a misconfiguration that compromises security of a system that includes the store 804. It will be recognized that assigning both the candidate role and the employee role to the principal 602 may compromise the security of the system in other ways, such as by enabling the principal 602 to read answers written by other candidates.

In an example implementation, a principal p∈ P is a string identifier. Principals adhere to an organizational hierarchy and thus are partially ordered. An ordering $\sqsubseteq_p$ is defined where $p \sqsubseteq_p p'$ iff p is a p'. For example, $\emph{engineering 123} \sqsubseteq_{P} \emph{full time employee}$. In accordance with this implementation, a resource is included in a scope. A scope s∈ S is a string path that specifies a scope. The scope has the form mg/sub/rg/rsc where mg (management group), sub (subscription), rg (resource group), and rsc (resource) are strings. An ordering $\sqsubseteq_S$ is defined where if s $\sqsubseteq_S$ s' then s' is a prefix of s. For example, test1/t/abc $\sqsubseteq_S$ test1/t/. In further accordance with this implementation, a role r∈R is defined such that r=({a}, {ã}, s) where {a} is a set of allow actions and {ã} is a set of deny actions. A role has an assignable scope s, which is a scope. Actions are of type wcString. An accessor notation is defined on a role such that r.a accesses all allow actions, r. ã accesses all deny actions, and r.s accesses scope. In further accordance with this implementation, a role assignment assigns a role to a principal at a scope, thus attaching the permissions in the role to the principal for the resources in the scope. In further accordance with this implementation, role assignments are transitive for groups, which means that if a user is a member of a group and that group is a member of another group that has a role assignment, the user will have the permissions in the role assignment as well (i.e., roles flow downwards in the $\sqsubseteq_p$ hierarchy). In further accordance with this implementation, a role assignment λ∈Λ is defined as a triple ⟨p, r, s⟩ where p∈ P is a principal, r ∈R is a role, and s∈S is a scope. In further accordance with this implementation, an assignment is valid iff r.s $\sqsubseteq_S$ s. It will be recognized that an additive role assignment model may be utilized to enable a complex set of overlapping role assignments. In further accordance with this implementation, a RBAC state σ∈Σ is a set of role assignments.

In further accordance with this implementation, hierarchy-based conformance determination logic (e.g., the hierarchy-based conformance determination logic 108 or 508 shown in FIG. 1 or 5, respectively) creates a collapsed role assignment that accounts for principal hierarchies ($\sqsubseteq_P$) and scope hierarchies ($\sqsubseteq_S$) (e.g., within an RBAC system or by querying an RBAC system). Assuming a role assignment ⟨p, r, s⟩ and an RBAC state σ, assignments in σ that have a principal p' such that p $\sqsubseteq_p$ p' are traversed. Any of these assignments that do not have a scope s' such that s $\sqsubseteq$ s' are discarded. A single specialized assignment (e.g., a static policy) is formed: (p, {r} ∪ {r₀ . . . rₙ}, ⊔{s₀ . . . sₙ}) that contains any actions from roles that the role of the role assignment inherits.

In further accordance with this implementation, assignments that are capable of being impacted by the specialized assignment (i.e., assignments that have a p'⊑ p and s'⊑ s) are identified. The hierarchy-based conformance determination logic forms a static policy snapshot based on these assignments and the specialized assignment. The static policy snapshot Π is defined as a set of quadruples π=⟨p, a, ã, s⟩ where p, s∈ string and a, ã∈ ℘ (wcString).

In further accordance with this implementation, a specification Φ is defined as a set of quadruples φ=(p, a, ã, s) where p, s E wcString and a, ã∈ ℘ (wcString). Similar to roles, the hierarchy-based conformance determination logic defines accessors on all subcomponents of a property (e.g., pr∈ 𝒫, pr.p denotes the p wcString subcomponent of property pr).

Figure 9:
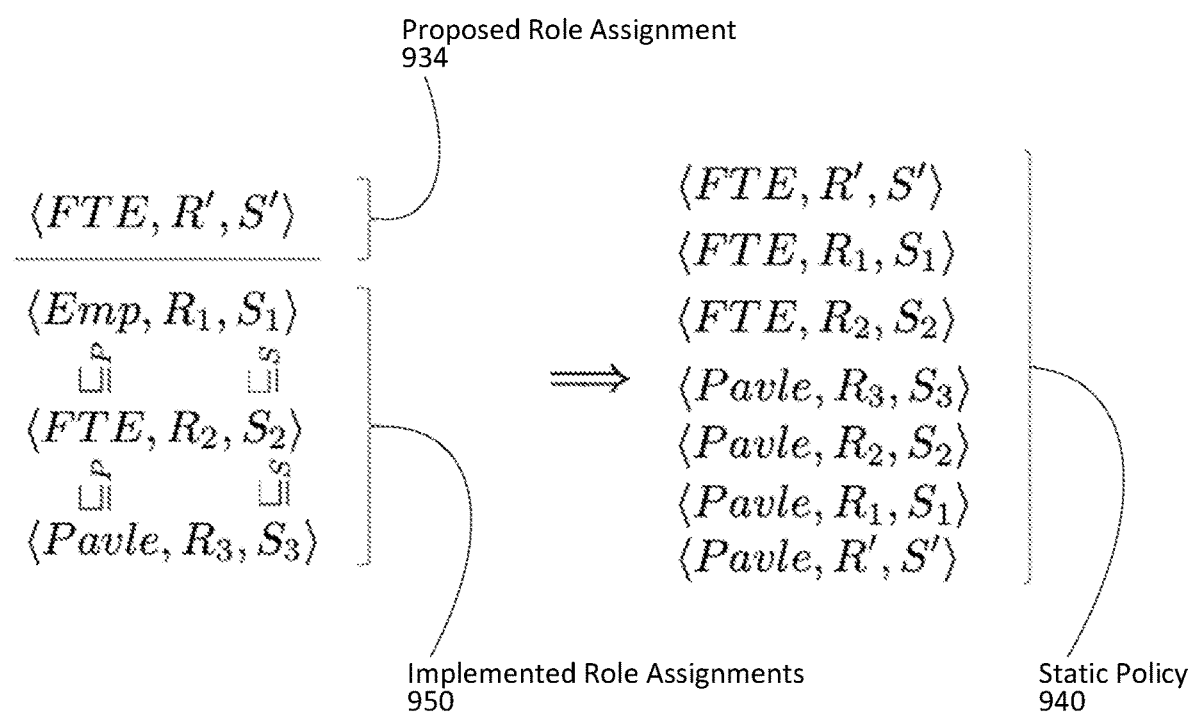
FIG. 9 illustrates generation of an example static policy from a proposed role assignment and implemented role assignments in accordance with an embodiment.

FIG. 9 illustrates generation of an example static policy 940 from a proposed role assignment 934 and implemented role assignments 950 in accordance with an embodiment. The proposed role assignment 934 is depicted as ⟨ FTE, r', s'⟩. The implemented role assignments 950 are referred to as the RBAC state. The implemented role assignments 950 are depicted as ⟨ Emp, r₁, s₁⟩, ⟨ FTE, r₂, s₂⟩, and ⟨ Pavle, r₃, s₃⟩. In accordance with the example implementation mentioned above, the hierarchy-based conformance determination logic creates additional role assignments for FTE, namely r1 and r2 because FTE ⊑p Emp and FTE ⊑p FTE and s' ⊑s s₁ and s' ⊑s s₂. Because ⟨ Pavle, r₃, s₃⟩ is impacted by the FTE assignment, ⟨ Pavle, r₃, s₃⟩ is included in the static policy 940 due to the possibility that the assignment may violate security properties.

FIG. 10 shows example semantics 1000 of a static policy in accordance with an embodiment. The semantics 1000 includes seven rules for illustrative purposes. Rule 1 states that a policy can be defined by a union of smaller policies. Rule 2 defines a policy by converting a tuple to a conjunction of principals, actions, and scopes. Rule 3 defines a free variable for all principals. Rule 4 defines actions as the conjunction of the positive action and the negation of negative action. Rule 5 defines actions as the union of all single actions. Rule 6 defines a scope, s, as a variable for every scope. Rule 7 defines an action as a wild card string, which includes a prefix variable, a body variable, and a suffix variable.

It should be noted that a specification may be defined similarity to the static policy in that principals and scopes can be wild card strings. It should be further noted that the variables of each dimension of a policy are also in the specification. Accordingly, the verification problem is to find a model for the free variables.

Figure 11:
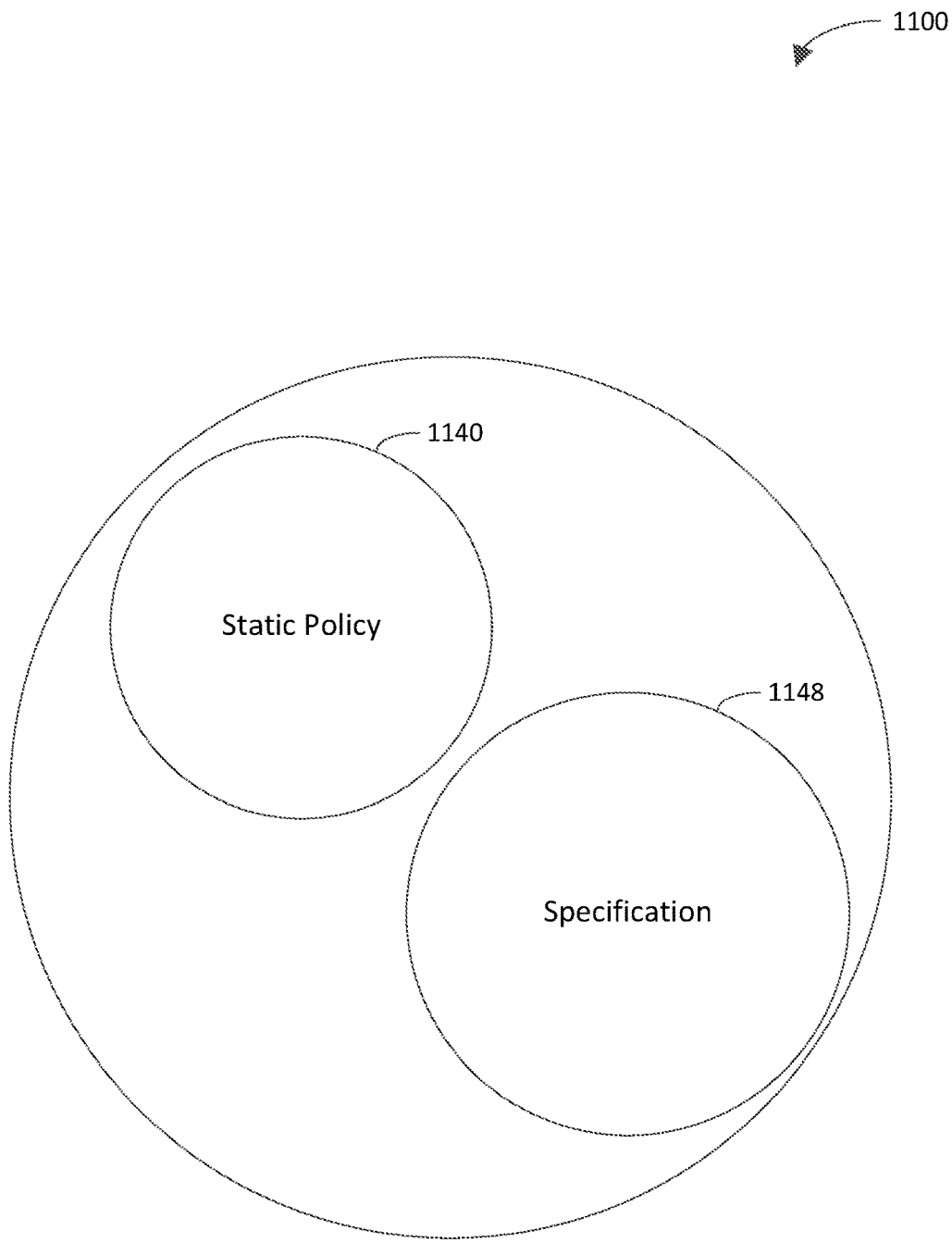
FIG. 11 depicts a relationship between a static policy and a specification in accordance with an embodiment.

FIG. 11 depicts a relationship 1100 between a static policy 1140 and a specification 1148 in accordance with an embodiment. In the following discussion, the static policy 1140 is represented by Π, and the specification 1148 is represented by φ. The specification 1148 may define a boundary of allowed actions. It may be desirable to check whether a policy is contained in the allowed behavior or if the policy is external to the boundary. A containment property that enables this functionality may be defined as follows:

$$[\![\Pi]\!] \Rightarrow [\![\Phi]\!]$$

The specification 1148 may define configurations that are not allowed. To verify that the static policy 1140 does not overlap with the specification 1148, a disjointness property may be defined as follows:

$$[\![\Phi]\!] \wedge \neg [\![\Pi]\!]$$

In an example embodiment, given a first policy φ₁ and a second policy φ₂, the first policy φ₁ is redundant iff $$[\![\Phi_1]\!] \wedge ([\![\Phi_2]\!] \wedge [\![\Phi_3]\!]...) \equiv [\![\Phi_2]\!]$$

In another example embodiment, given a first policy φ₁ and a second policy φ₂, the first policy φ₁ is inconsistent iff $$\Phi_1 \wedge \Phi_2 \equiv \text{False}$$

Any one or more of the hierarchy-based conformance determination logic 108, the hierarchy-based conformance determination logic 508, the store 510, the impact determination logic 512, the policy generation logic 514, the policy conversion logic 516, the specification conversion logic 518, the conformance determination logic 520, the action logic 522, the redundancy determination logic 524, the inconsistency determination logic 526, the proposed assignment determination logic 528, the implemented assignment determination logic 530, the impacted assignment selection logic 532, flowchart 200, flowchart 300, and/or flowchart 400 may be implemented in hardware, software, firmware, or any combination thereof.

For example, any one or more of the hierarchy-based conformance determination logic 108, the hierarchy-based conformance determination logic 508, the store 510, the impact determination logic 512, the policy generation logic 514, the policy conversion logic 516, the specification conversion logic 518, the conformance determination logic 520, the action logic 522, the redundancy determination logic 524, the inconsistency determination logic 526, the proposed assignment determination logic 528, the implemented assignment determination logic 530, the impacted assignment selection logic 532, flowchart 200, flowchart 300, and/or flowchart 400 may be implemented, at least in part, as computer program code configured to be executed in one or more processors.

In another example, any one or more of the hierarchy-based conformance determination logic 108, the hierarchy-based conformance determination logic 508, the store 510, the impact determination logic 512, the policy generation logic 514, the policy conversion logic 516, the specification conversion logic 518, the conformance determination logic 520, the action logic 522, the redundancy determination logic 524, the inconsistency determination logic 526, the proposed assignment determination logic 528, the implemented assignment determination logic 530, the impacted assignment selection logic 532, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
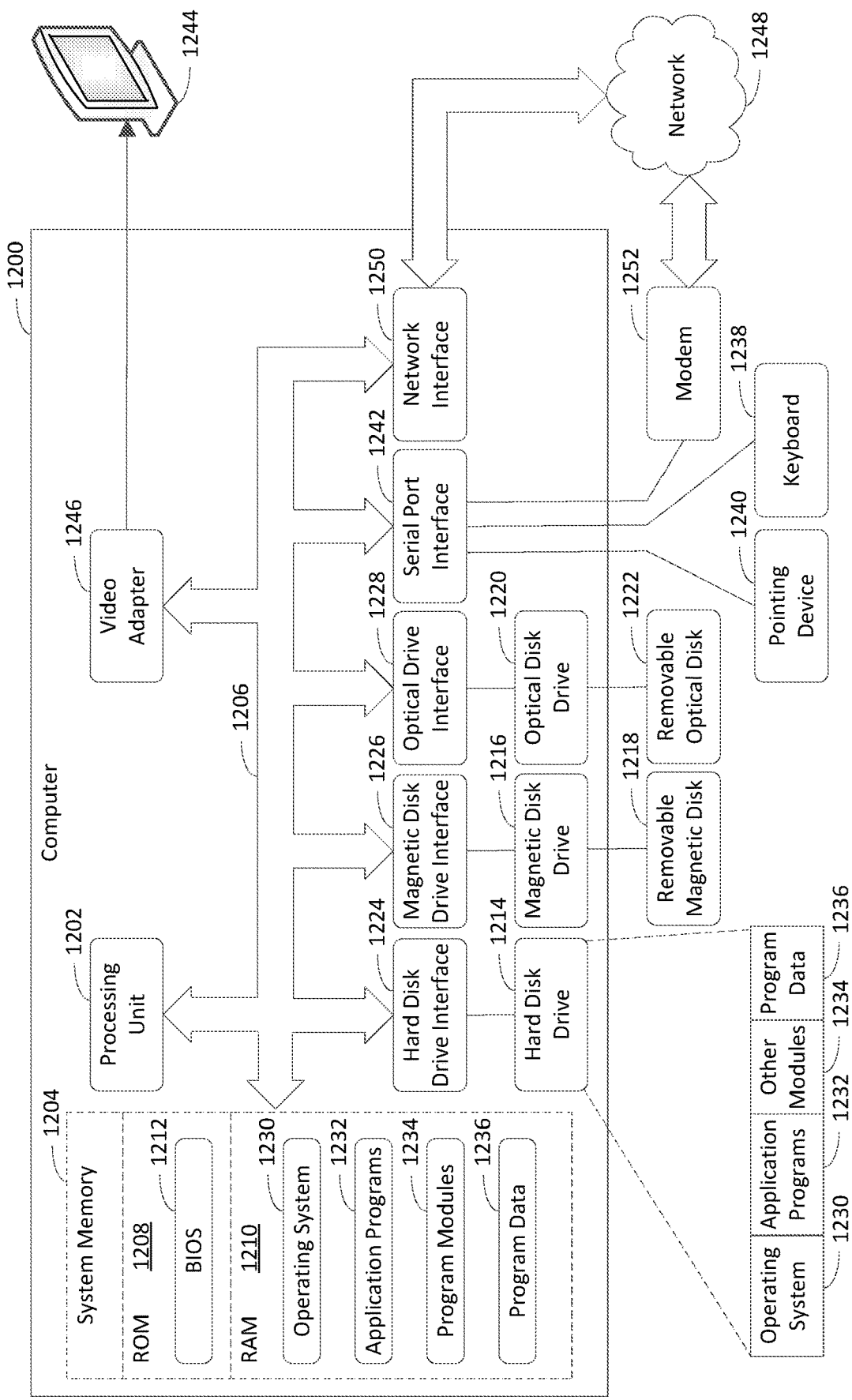
FIG. 12 depicts an example computer in which embodiments may be implemented.

II. Further Discussion of Some Example Embodiments (A1) An example system (FIG. 1, 102A-102M, 106A-106N; FIG. 5, 500; FIG. 12, 1200) comprises memory (FIG. 12, 1204, 1208, 1210) and a processing system (FIG. 12, 1202) coupled to the memory. The processing system is configured to identify (FIG. 2, 202) role assignments (FIG. 5, 550) that assign roles to principals. The roles define permissions that enable the principals to which the roles are assigned to perform actions with regard to resources. The roles are included in a dynamic role hierarchy in which a subset of the roles that has a relatively lower rank in the dynamic role hierarchy inherits a permission from a subset of the roles that has a relatively higher rank in the dynamic role hierarchy. The processing system is further configured to identify (FIG. 2, 204) a proposed role assignment that proposes assignment of a designated role to a designated principal. The designated role defines a designated permission that enables the designated principal to perform a designated action with regard to a designated resource. The processing system is further configured to select (FIG. 2, 206) impacted role assignments from the role assignments based at least on the impacted role assignments corresponding to the designated role or another role in the dynamic role hierarchy that includes the designated role or that is included in the designated role and further based at least on the impacted role assignments corresponding to the designated resource or a resource that includes the designated resource or that is included in the designated resource. The processing system is further configured to generate (FIG. 2, 208) a static policy, which is defined by the impacted role assignments and the proposed role assignment. The processing system is further configured to convert (FIG. 2, 210) the static policy into a first logical artifact. The processing system is further configured to convert (FIG. 2, 212) a specification (FIG. 5, 548), which includes security properties (FIG. 5, 552) that define boundaries of specified allowed actions and specified disallowed actions with regard to at least a subset of the resources such that the boundaries define constraints on the role assignments and the proposed role assignment, and a relationship property, which defines a relationship between the specification and the static policy, into a second logical artifact. The processing system is further configured to, prior to implementation of the proposed role assignment, determine (FIG. 2, 214) whether the proposed role assignment conforms to the security properties in the specification by comparing the first logical artifact and the second logical artifact. The processing system is further configured to, based at least on whether the proposed role assignment conforms to the security properties, perform (FIG. 2, 220) an action (FIG. 5, 564) with regard to the proposed role assignment.

(A2) In the example system of A1, wherein the processing system is configured to: prior to implementation of the proposed role assignment, determine whether the proposed role assignment conforms to the security properties in the specification by comparing the first logical artifact and the second logical artifact in accordance with a satisfiability modulo theories technique.

(A3) In the example system of any of A1-A2, wherein the processing system is configured to: prior to implementation of the proposed role assignment, determine whether a scope of the static policy contains a scope of the security properties that define the boundaries of the specified allowed actions by comparing the first logical artifact and the second logical artifact, the scope of the static policy containing the scope of the security properties that define the boundaries of the specified allowed actions indicating that the proposed role assignment conforms to the security properties in the specification, the scope of the static policy not containing the scope of the security properties that define the boundaries of the specified allowed actions indicating that the proposed role assignment does not conform to the security properties in the specification; and perform the action with regard to the proposed role assignment based at least on whether the scope of the static policy contains the scope of the security properties that define the boundaries of the specified allowed actions.

(A4) In the example system of any of A1-A3, wherein the processing system is configured to: prior to implementation of the proposed role assignment, determine whether a scope of the static policy overlaps with a scope of the security properties that define the boundaries of the specified disallowed actions by comparing the first logical artifact and the second logical artifact, the scope of the static policy overlapping with the scope of the security properties that define the boundaries of the specified disallowed actions indicating that the proposed role assignment does not conform to the security properties in the specification, the scope of the static policy not overlapping with the scope of the security properties that define the boundaries of the specified disallowed actions indicating that the proposed role assignment conforms to the security properties in the specification; and perform the action with regard to the proposed role assignment based at least on whether the scope of the static policy overlaps with the scope of the security properties that define the boundaries of the specified disallowed actions.

(A5) In the example system of any of A1-A4, wherein the processing system is further configured to: identify a second proposed role assignment that proposes assignment of a second designated role to a second designated principal, the second designated role defining a second designated permission that enables the second designated principal to perform a second designated action with regard to a second designated resource; select second impacted role assignments from the role assignments based at least on the second impacted role assignments corresponding to the second designated role or another role in the dynamic role hierarchy that includes the second designated role or that is included in the second designated role and further based at least on the second impacted role assignments corresponding to the second designated resource or a resource that includes the second designated resource or that is included in the second designated resource; and generate a second static policy, which is defined by the second impacted role assignments and the second proposed role assignment.

(A6) In the example system of any of A1-A5, wherein the processing system is further configured to: convert the second static policy into third logical artifact; determine whether the second static policy is redundant with regard to the first static policy, based at least on whether application of a Boolean AND operation to the first static policy and the second static policy results in the second static policy, by comparing the first logical artifact and the third logical artifact, wherein application of the Boolean AND operation to the first static policy and the second static policy resulting in the second static policy indicates that the second static policy is redundant, and wherein application of the Boolean AND operation to the first static policy and the second static policy not resulting in the second static policy indicates that the second static policy is not redundant; and perform either a first action or a second action based at least on whether the second static policy is redundant.

(A7) In the example system of any of A1-A6, wherein the processing system is further configured to: convert the second static policy into third logical artifact; determine whether the second static policy is inconsistent with the first static policy, based at least on whether application of a Boolean AND operation to the first static policy and the second static policy results in an empty set, by comparing the first logical artifact and the third logical artifact, wherein application of the Boolean AND operation to the first static policy and the second static policy resulting in the empty set indicates that the second static policy is inconsistent with the first static policy, and wherein application of the Boolean AND operation to the first static policy and the second static policy not resulting in the empty set indicates that the second static policy is not inconsistent with the first static policy; and perform either a first action or a second action based at least on whether the second static policy is inconsistent with the first static policy.

(A8) In the example system of any of A1-A7, wherein the processing system is configured to: convert a second specification, which includes second security properties that define second boundaries of second specified allowed actions and second specified disallowed actions with regard to at least a second subset of the resources such that the second boundaries define second constraints on the role assignments and the proposed role assignment, and a second relationship property, which defines a relationship between the second specification and the static policy, into third logical artifact; prior to implementation of the proposed role assignment, determine whether the proposed role assignment conforms to the second security properties in the second specification by comparing the first logical artifact and the third logical artifact; and perform the action with regard to the role assignment based at least on whether the proposed role assignment conforms to the security properties and further based at least on whether the proposed role assignment conforms to the second security properties.

(A9) In the example system of any of A1-A8, wherein the processing system is configured to: perform a remedial action that addresses a security risk that results from the proposed role assignment not conforming to at least one of the security properties.

(B1) An example method is implemented by a computing system (FIG. 1, 102A-102M, 106A-106N; FIG. 5, 500; FIG. 12, 1200). The method comprises identifying (FIG. 2, 202) role assignments (FIG. 5, 550) that assign roles to principals. The roles define permissions that enable the principals to which the roles are assigned to perform actions with regard to resources, the roles are included in a dynamic role hierarchy in which a subset of the roles that has a relatively lower rank in the dynamic role hierarchy inherits a permission from a subset of the roles that has a relatively higher rank in the dynamic role hierarchy. The method further comprises identifying (FIG. 2, 204) a proposed role assignment that proposes assignment of a designated role to a designated principal. The designated role define a designated permission that enables the designated principal to perform a designated action with regard to a designated resource. The method further comprises selecting (FIG. 2, 206) impacted role assignments from the role assignments based at least on the impacted role assignments corresponding to the designated role or another role in the dynamic role hierarchy that includes the designated role or that is included in the designated role and further based at least on the impacted role assignments corresponding to the designated resource or a resource that includes the designated resource or that is included in the designated resource. The method further comprises generating (FIG. 2, 208) a static policy, which is defined by the impacted role assignments and the proposed role assignment. The method further comprises converting (FIG. 2, 210) the static policy into a first logical artifact. The method further comprises converting (FIG. 2, 212) a specification (FIG. 5, 548), which includes security properties that define boundaries of specified allowed actions and specified disallowed actions with regard to at least a subset of the resources such that the boundaries define constraints on the role assignments and the proposed role assignment, and a relationship property, which defines a relationship between the specification and the static policy, into a second logical artifact. The method further comprises, prior to implementation of the proposed role assignment, determining (FIG. 2, 214) whether the proposed role assignment conforms to the security properties in the specification by comparing the first logical artifact and the second logical artifact. The method further comprises, based at least on whether the proposed role assignment conforms to the security properties, performing (FIG. 2, 220) an action (FIG. 5, 564) with regard to the proposed role assignment.

(B2) In the method of B1, wherein determining whether the proposed role assignment conforms to the security properties in the specification comprises: prior to implementation of the proposed role assignment, determining whether the proposed role assignment conforms to the security properties in the specification by comparing the first logical artifact and the second logical artifact in accordance with a satisfiability modulo theories technique.

(B3) In the method of any of B1-B2, wherein determining whether the proposed role assignment conforms to the security properties in the specification comprises: prior to implementation of the proposed role assignment, determining whether a scope of the static policy contains a scope of the security properties that define the boundaries of the specified allowed actions by comparing the first logical artifact and the second logical artifact, the scope of the static policy containing the scope of the security properties that define the boundaries of the specified allowed actions indicating that the proposed role assignment conforms to the security properties in the specification, the scope of the static policy not containing the scope of the security properties that define the boundaries of the specified allowed actions indicating that the proposed role assignment does not conform to the security properties in the specification; and wherein performing the action with regard to the proposed role assignment is based at least on whether the scope of the static policy contains the scope of the security properties that define the boundaries of the specified allowed actions.

(B4) In the method of any of B1-B3, wherein determining whether the proposed role assignment conforms to the security properties in the specification comprises: prior to implementation of the proposed role assignment, determining whether a scope of the static policy overlaps with a scope of the security properties that define the boundaries of the specified disallowed actions by comparing the first logical artifact and the second logical artifact, the scope of the static policy overlapping with the scope of the security properties that define the boundaries of the specified disallowed actions indicating that the proposed role assignment does not conform to the security properties in the specification, the scope of the static policy not overlapping with the scope of the security properties that define the boundaries of the specified disallowed actions indicating that the proposed role assignment conforms to the security properties in the specification; and wherein performing the action with regard to the proposed role assignment is based at least on whether the scope of the static policy overlaps with the scope of the security properties that define the boundaries of the specified disallowed actions.

(B5) In the method of any of B1-B4, further comprising: identifying a second proposed role assignment that proposes assignment of a second designated role to a second designated principal, the second designated role defining a second designated permission that enables the second designated principal to perform a second designated action with regard to a second designated resource; selecting second impacted role assignments from the role assignments based at least on the second impacted role assignments corresponding to the second designated role or another role in the dynamic role hierarchy that includes the second designated role or that is included in the second designated role and further based at least on the second impacted role assignments corresponding to the second designated resource or a resource that includes the second designated resource or that is included in the second designated resource; and generating a second static policy, which is defined by the second impacted role assignments and the second proposed role assignment.

(B6) In the method of any of B1-B5, further comprising: converting the second static policy into third logical artifact; determining whether the second static policy is redundant with regard to the first static policy, based at least on whether application of a Boolean AND operation to the first static policy and the second static policy results in the second static policy, by comparing the first logical artifact and the third logical artifact, wherein application of the Boolean AND operation to the first static policy and the second static policy resulting in the second static policy indicates that the second static policy is redundant, and wherein application of the Boolean AND operation to the first static policy and the second static policy not resulting in the second static policy indicates that the second static policy is not redundant; and performing either a first action or a second action based at least on whether the second static policy is redundant.

(B7) In the method of any of B1-B6, further comprising: converting the second static policy into third logical artifact; determining whether the second static policy is inconsistent with the first static policy, based at least on whether application of a Boolean AND operation to the first static policy and the second static policy results in an empty set, by comparing the first logical artifact and the third logical artifact, wherein application of the Boolean AND operation to the first static policy and the second static policy resulting in the empty set indicates that the second static policy is inconsistent with the first static policy, and wherein application of the Boolean AND operation to the first static policy and the second static policy not resulting in the empty set indicates that the second static policy is not inconsistent with the first static policy; and performing either a first action or a second action based at least on whether the second static policy is inconsistent with the first static policy.

(B8) In the method of any of B1-B7, further comprising: converting a second specification, which includes second security properties that define second boundaries of second specified allowed actions and second specified disallowed actions with regard to at least a second subset of the resources such that the second boundaries define second constraints on the role assignments and the proposed role assignment, and a second relationship property, which defines a relationship between the second specification and the static policy, into third logical artifact; and prior to implementation of the proposed role assignment, determining whether the proposed role assignment conforms to the second security properties in the second specification by comparing the first logical artifact and the third logical artifact; wherein performing the action with regard to the role assignment is based at least on whether the proposed role assignment conforms to the security properties and further based at least on whether the proposed role assignment conforms to the second security properties.

(B9) In the method of any of B1-B8, wherein performing the action with regard to the proposed role assignment comprises: performing a remedial action that addresses a security risk that results from the proposed role assignment not conforming to at least one of the security properties.

(C1) An example computer program product (FIG. 12, 1218, 1222) comprising a computer-readable storage medium having instructions recorded thereon for enabling a processor-based system (FIG. 1, 102A-102M, 106A-106N; FIG. 5, 500; FIG. 12, 1200) to perform operations. The operations comprise identifying (FIG. 2, 202) role assignments (FIG. 5, 550) that assign roles to principals. The roles define permissions that enable the principals to which the roles are assigned to perform actions with regard to resources. The roles are included in a dynamic role hierarchy in which a subset of the roles that has a relatively lower rank in the dynamic role hierarchy inherits a permission from a subset of the roles that has a relatively higher rank in the dynamic role hierarchy. The operations further comprise identifying (FIG. 2, 204) a proposed role assignment that proposes assignment of a designated role to a designated principal. The designated role defines a designated permission that enables the designated principal to perform a designated action with regard to a designated resource. The operations further comprise selecting (FIG. 2, 206) impacted role assignments from the role assignments based at least on the impacted role assignments corresponding to the designated role or another role in the dynamic role hierarchy that includes the designated role or that is included in the designated role and further based at least on the impacted role assignments corresponding to the designated resource or a resource that includes the designated resource or that is included in the designated resource. The operations further comprise generating (FIG. 2, 208) a static policy, which is defined by the impacted role assignments and the proposed role assignment. The operations further comprise converting (FIG. 2, 210) the static policy into a first logical artifact. The operations further comprise converting (FIG. 2, 212) a specification (FIG. 5, 548), which includes security properties (FIG. 5, 552) that define boundaries of specified allowed actions and specified disallowed actions with regard to at least a subset of the resources such that the boundaries define constraints on the role assignments and the proposed role assignment, and a relationship property, which defines a relationship between the specification and the static policy, into a second logical artifact. The operations further comprise, prior to implementation of the proposed role assignment, determining (FIG. 2, 214) whether the proposed role assignment conforms to the security properties in the specification by comparing the first logical artifact and the second logical artifact. The operations further comprise, based at least on whether the proposed role assignment conforms to the security properties, performing (FIG. 2, 220) an action (FIG. 5, 564) with regard to the proposed role assignment.

III. Example Computer System

FIG. 12 depicts an example computer 1200 in which embodiments may be implemented. Any one or more of the user devices 102A-102M and/or any one or more of the servers 106A-106N shown in FIG. 1 and/or computing system 500 shown in FIG. 5 may be implemented using computer 1200, including one or more features of computer 1200 and/or alternative features. Computer 1200 may be a general-purpose computing device in the form of a conventional personal computer, a mobile computer, or a workstation, for example, or computer 1200 may be a special purpose computing device. The description of computer 1200 provided herein is provided for purposes of illustration, and is not intended to be limiting. Embodiments may be implemented in further types of computer systems, as would be known to persons skilled in the relevant art(s).

As shown in FIG. 12, computer 1200 includes a processing unit 1202, a system memory 1204, and a bus 1206 that couples various system components including system memory 1204 to processing unit 1202. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computer 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1230, one or more application programs 1232, other program modules 1234, and program data 1236. Application programs 1232 or program modules 1234 may include, for example, computer program logic for implementing any one or more of (e.g., at least a portion of) the hierarchy-based conformance determination logic 108, the hierarchy-based conformance determination logic 508, the impact determination logic 512, the policy generation logic 514, the policy conversion logic 516, the specification conversion logic 518, the conformance determination logic 520, the action logic 522, the redundancy determination logic 524, the inconsistency determination logic 526, the proposed assignment determination logic 528, the implemented assignment determination logic 530, the impacted assignment selection logic 532, flowchart 200 (including any step of flowchart 200), flowchart 300 (including any step of flowchart 300), and/or flowchart 400 (including any step of flowchart 400), as described herein.

A user may enter commands and information into the computer 1200 through input devices such as keyboard 1238 and pointing device 1240. Other input devices (not shown) may include a microphone, joystick, game pad, satellite dish, scanner, touch screen, camera, accelerometer, gyroscope, or the like. These and other input devices are often connected to the processing unit 1202 through a serial port interface 1242 that is coupled to bus 1206, but may be connected by other interfaces, such as a parallel port, game port, or a universal serial bus (USB).

A display device 1244 (e.g., a monitor) is also connected to bus 1206 via an interface, such as a video adapter 1246. In addition to display device 1244, computer 1200 may include other peripheral output devices (not shown) such as speakers and printers.

Computer 1200 is connected to a network 1248 (e.g., the Internet) through a network interface or adapter 1250, a modem 1252, or other means for establishing communications over the network. Modem 1252, which may be internal or external, is connected to bus 1206 via serial port interface 1242.

As used herein, the terms "computer program medium" and "computer-readable storage medium" are used to generally refer to media (e.g., non-transitory media) such as the hard disk associated with hard disk drive 1214, removable magnetic disk 1218, removable optical disk 1222, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250 or serial port interface 1242. Such computer programs, when executed or loaded by an application, enable computer 1200 to implement features of embodiments discussed herein. Accordingly, such computer programs represent controllers of the computer 1200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
      identify role assignments that assign roles to principals, the roles defining permissions that enable the principals to which the roles are assigned to perform actions with regard to resources, the roles are comprised in a dynamic role hierarchy in which a subset of the roles that has a relatively lower rank in the dynamic role hierarchy inherits a permission from a subset of the roles that has a relatively higher rank in the dynamic role hierarchy;
      identify a proposed role assignment that proposes assignment of a designated role to a designated principal, the designated role defining a designated permission that enables the designated principal to perform a designated action with regard to a designated resource;
      select impacted role assignments from the role assignments based at least on the impacted role assignments comprising a first impacted role assignment corresponding to the designated role, a second impacted role assignment corresponding to another role in the dynamic role hierarchy that comprises the designated role, and a third impacted role assignment corresponding to yet another role that is comprised in the designated role and further based at least on the impacted role assignments corresponding to the designated resource or a resource that comprises the designated resource or that is comprised in the designated resource;
      generate a static policy, which is defined by the impacted role assignments and the proposed role assignment;
      convert the static policy into a first logical artifact;

convert a specification, which comprises security properties that define boundaries of specified allowed actions and specified disallowed actions with regard to at least a subset of the resources such that the boundaries define constraints on the role assignments and the proposed role assignment, and a relationship property, which defines a relationship between the specification and the static policy, into a second logical artifact;

prior to implementation of the proposed role assignment, determine whether the proposed role assignment conforms to the security properties in the specification by comparing the first logical artifact and the second logical artifact; and based at least on the proposed role assignment not conforming to at least one of the security properties, increase security of the designated resource by inhibiting the designated principal from at least one of viewing the designated resource, deleting the designated resource, inserting information into the designated resource, or changing a value associated with the designated resource.

2. The system of claim 1, wherein the processing system is configured to:

prior to implementation of the proposed role assignment, determine whether the proposed role assignment conforms to the security properties in the specification by comparing the first logical artifact and the second logical artifact in accordance with a satisfiability modulo theories technique.

3. The system of claim 1, wherein the processing system is configured to:

prior to implementation of the proposed role assignment, determine whether a scope of the static policy contains a scope of the security properties that define the boundaries of the specified allowed actions by comparing the first logical artifact and the second logical artifact, the scope of the static policy containing the scope of the security properties that define the boundaries of the specified allowed actions indicating that the proposed role assignment conforms to the security properties in the specification, the scope of the static policy not containing the scope of the security properties that define the boundaries of the specified allowed actions indicating that the proposed role assignment does not conform to the security properties in the specification; and based at least on the scope of the static policy not containing the scope of the security properties that define the boundaries of the specified allowed actions, increase the security of the designated resource by inhibiting the designated principal from at least one of viewing the designated resource, deleting the designated resource, inserting the information into the designated resource, or changing the value associated with the designated resource.

4. The system of claim 1, wherein the processing system is configured to:

prior to implementation of the proposed role assignment, determine whether a scope of the static policy overlaps with a scope of the security properties that define the boundaries of the specified disallowed actions by comparing the first logical artifact and the second logical artifact, the scope of the static policy overlapping with the scope of the security properties that define the boundaries of the specified disallowed actions indicating that the proposed role assignment does not conform to the security properties in the specification, the scope of the static policy not overlapping with the scope of the security properties that define the boundaries of the specified disallowed actions indicating that the proposed role assignment conforms to the security properties in the specification; and based at least on the scope of the static policy overlapping with the scope of the security properties that define the boundaries of the specified disallowed actions, increase the security of the designated resource by inhibiting the designated principal from at least one of viewing the designated resource, deleting the designated resource, inserting the information into the designated resource, or changing the value associated with the designated resource.

5. The system of claim 1, wherein the processing system is further configured to:

identify a second proposed role assignment that proposes assignment of a second designated role to a second designated principal, the second designated role defining a second designated permission that enables the second designated principal to perform a second designated action with regard to a second designated resource;

select second impacted role assignments from the role assignments based at least on the second impacted role assignments corresponding to the second designated role or another role in the dynamic role hierarchy that comprises the second designated role or that is comprised in the second designated role and further based at least on the second impacted role assignments corresponding to the second designated resource or a resource that comprises the second designated resource or that is comprised in the second designated resource; and generate a second static policy, which is defined by the second impacted role assignments and the second proposed role assignment.

6. The system of claim 5, wherein the processing system is further configured to:

convert the second static policy into third logical artifact;

determine whether the second static policy is redundant with regard to the first static policy, based at least on whether application of a Boolean AND operation to the first static policy and the second static policy results in the second static policy, by comparing the first logical artifact and the third logical artifact, wherein application of the Boolean AND operation to the first static policy and the second static policy resulting in the second static policy indicates that the second static policy is redundant, and wherein application of the Boolean AND operation to the first static policy and the second static policy not resulting in the second static policy indicates that the second static policy is not redundant; and perform either a first action or a second action based at least on whether the second static policy is redundant.

7. The system of claim 5, wherein the processing system is further configured to:

convert the second static policy into third logical artifact;

determine whether the second static policy is inconsistent with the first static policy, based at least on whether application of a Boolean AND operation to the first static policy and the second static policy results in an empty set, by comparing the first logical artifact and the third logical artifact,
  wherein application of the Boolean AND operation to the first static policy and the second static policy resulting in the empty set indicates that the second static policy is inconsistent with the first static policy, and
  wherein application of the Boolean AND operation to the first static policy and the second static policy not resulting in the empty set indicates that the second static policy is not inconsistent with the first static policy; and
 perform either a first action or a second action based at least on whether the second static policy is inconsistent with the first static policy.

8. The system of claim 1, wherein the processing system is configured to:
 convert a second specification, which comprises second security properties that define second boundaries of second specified allowed actions and second specified disallowed actions with regard to at least a second subset of the resources such that the second boundaries define second constraints on the role assignments and the proposed role assignment, and a second relationship property, which defines a relationship between the second specification and the static policy, into a third logical artifact;
 prior to implementation of the proposed role assignment, determine whether the proposed role assignment conforms to the second security properties in the second specification by comparing the first logical artifact and the third logical artifact; and
 based at least on the proposed role assignment not conforming to at least one of the security properties and further based at least on the proposed role assignment not conforming to at least one of the second security properties, increase the security of the designated resource by inhibiting the designated principal from at least one of viewing the designated resource, deleting the designated resource, inserting the information into the designated resource, or changing the value associated with the designated resource.

9. The system of claim 1, wherein the processing system is configured to:
 based at least on the proposed role assignment not conforming to at least one of the security properties, increase the security of the designated resource by inhibiting the designated principal from viewing the designated resource.

10. A method implemented by a computing system, the method comprising:
 identifying role assignments that assign roles to principals, the roles defining permissions that enable the principals to which the roles are assigned to perform actions with regard to resources, the roles are comprised in a dynamic role hierarchy in which a subset of the roles that has a relatively lower rank in the dynamic role hierarchy inherits a permission from a subset of the roles that has a relatively higher rank in the dynamic role hierarchy;
 identifying a proposed role assignment that proposes assignment of a designated role to a designated principal, the designated role defining a designated permission that enables the designated principal to perform a designated action with regard to a designated resource;
 selecting impacted role assignments from the role assignments based at least on the impacted role assignments corresponding to the designated role or another role in the dynamic role hierarchy that comprises the designated role or that is comprised in the designated role and further based at least on the impacted role assignments comprising a first impacted role assignment corresponding to the designated resource, a second impacted role assignment corresponding to a resource that comprises the designated resource, and a third impacted role assignment corresponding to another resource that is comprised in the designated resource;
 generating a static policy, which is defined by the impacted role assignments and the proposed role assignment;
 converting the static policy into a first logical artifact;
 converting a specification, which comprises security properties that define boundaries of specified allowed actions and specified disallowed actions with regard to at least a subset of the resources such that the boundaries define constraints on the role assignments and the proposed role assignment, and a relationship property, which defines a relationship between the specification and the static policy, into a second logical artifact;
 prior to implementation of the proposed role assignment, determining whether the proposed role assignment conforms to the security properties in the specification by comparing the first logical artifact and the second logical artifact; and
 based at least on the proposed role assignment not conforming to at least one of the security properties, increasing security of the designated resource by inhibiting the designated principal from at least one of viewing the designated resource, deleting the designated resource, inserting information into the designated resource, or changing a value associated with the designated resource.

11. The method of claim 10, wherein determining whether the proposed role assignment conforms to the security properties in the specification comprises:
 prior to implementation of the proposed role assignment, determining whether the proposed role assignment conforms to the security properties in the specification by comparing the first logical artifact and the second logical artifact in accordance with a satisfiability modulo theories technique.

12. The method of claim 10, wherein determining whether the proposed role assignment conforms to the security properties in the specification comprises:
 prior to implementation of the proposed role assignment, determining whether a scope of the static policy contains a scope of the security properties that define the boundaries of the specified allowed actions by comparing the first logical artifact and the second logical artifact,
  the scope of the static policy containing the scope of the security properties that define the boundaries of the specified allowed actions indicating that the proposed role assignment conforms to the security properties in the specification,
  the scope of the static policy not containing the scope of the security properties that define the boundaries of the specified allowed actions indicating that the proposed role assignment does not conform to the security properties in the specification; and
 wherein increasing the security of the designated resource comprises:

based at least on the scope of the static policy not containing the scope of the security properties that define the boundaries of the specified allowed actions, increasing the security of the designated resource by inhibiting the designated principal from at least one of viewing the designated resource, deleting the designated resource, inserting the information into the designated resource, or changing the value associated with the designated resource.

13. The method of claim 10, wherein determining whether the proposed role assignment conforms to the security properties in the specification comprises:
prior to implementation of the proposed role assignment, determining whether a scope of the static policy overlaps with a scope of the security properties that define the boundaries of the specified disallowed actions by comparing the first logical artifact and the second logical artifact,
the scope of the static policy overlapping with the scope of the security properties that define the boundaries of the specified disallowed actions indicating that the proposed role assignment does not conform to the security properties in the specification,
the scope of the static policy not overlapping with the scope of the security properties that define the boundaries of the specified disallowed actions indicating that the proposed role assignment conforms to the security properties in the specification; and
wherein increasing the security of the designated resource comprises:
based at least on the scope of the static policy overlapping with the scope of the security properties that define the boundaries of the specified disallowed actions, increasing the security of the designated resource by inhibiting the designated principal from at least one of viewing the designated resource, deleting the designated resource, inserting the information into the designated resource, or changing the value associated with the designated resource.

14. The method of claim 10, further comprising:
identifying a second proposed role assignment that proposes assignment of a second designated role to a second designated principal, the second designated role defining a second designated permission that enables the second designated principal to perform a second designated action with regard to a second designated resource;
selecting second impacted role assignments from the role assignments based at least on the second impacted role assignments corresponding to the second designated role or another role in the dynamic role hierarchy that comprises the second designated role or that is comprised in the second designated role and further based at least on the second impacted role assignments corresponding to the second designated resource or a resource that comprises the second designated resource or that is comprised in the second designated resource; and
generating a second static policy, which is defined by the second impacted role assignments and the second proposed role assignment.

15. The method of claim 14, further comprising:
converting the second static policy into third logical artifact;
determining whether the second static policy is redundant with regard to the first static policy, based at least on whether application of a Boolean AND operation to the first static policy and the second static policy results in the second static policy, by comparing the first logical artifact and the third logical artifact,
wherein application of the Boolean AND operation to the first static policy and the second static policy resulting in the second static policy indicates that the second static policy is redundant, and
wherein application of the Boolean AND operation to the first static policy and the second static policy not resulting in the second static policy indicates that the second static policy is not redundant; and
performing either a first action or a second action based at least on whether the second static policy is redundant.

16. The method of claim 14, further comprising:
converting the second static policy into third logical artifact;
determining whether the second static policy is inconsistent with the first static policy, based at least on whether application of a Boolean AND operation to the first static policy and the second static policy results in an empty set, by comparing the first logical artifact and the third logical artifact,
wherein application of the Boolean AND operation to the first static policy and the second static policy resulting in the empty set indicates that the second static policy is inconsistent with the first static policy, and
wherein application of the Boolean AND operation to the first static policy and the second static policy not resulting in the empty set indicates that the second static policy is not inconsistent with the first static policy; and
performing either a first action or a second action based at least on whether the second static policy is inconsistent with the first static policy.

17. The method of claim 10, further comprising:
converting a second specification, which comprises second security properties that define second boundaries of second specified allowed actions and second specified disallowed actions with regard to at least a second subset of the resources such that the second boundaries define second constraints on the role assignments and the proposed role assignment, and a second relationship property, which defines a relationship between the second specification and the static policy, into third logical artifact; and
prior to implementation of the proposed role assignment, determining whether the proposed role assignment conforms to the second security properties in the second specification by comparing the first logical artifact and the third logical artifact;
wherein increasing the security of the designated resource comprises:
based at least on the proposed role assignment not conforming to at least one of the security properties and further based at least on the proposed role assignment not conforming to the second security properties, increasing the security of the designated resource by inhibiting the designated principal from at least one of viewing the designated resource, deleting the designated resource, inserting the information into the designated resource, or changing the value associated with the designated resource.

18. The method of claim 10, wherein increasing the security of the designated resource comprises:

based at least on the proposed role assignment not conforming to at least one of the security properties, increasing the security of the designated resource by inhibiting the designated principal from inserting the information into the designated resource.

19. A computer program product comprising a computer-readable storage medium having instructions recorded thereon for enabling a processor-based system to perform operations, the operations comprising:

identifying role assignments that assign roles to principals, the roles defining permissions that enable the principals to which the roles are assigned to perform actions with regard to resources, the roles are comprised in a dynamic role hierarchy in which a subset of the roles that has a relatively lower rank in the dynamic role hierarchy inherits a permission from a subset of the roles that has a relatively higher rank in the dynamic role hierarchy;

identifying a proposed role assignment that proposes assignment of a designated role to a designated principal, the designated role defining a designated permission that enables the designated principal to perform a designated action with regard to a designated resource;

selecting impacted role assignments from the role assignments based at least on the impacted role assignments comprising a first impacted role assignment corresponding to the designated role, a second impacted role assignment corresponding to another role in the dynamic role hierarchy that comprises the designated role, and a third impacted role assignment corresponding to yet another role in the dynamic rule hierarchy that is comprised in the designated role and further based at least on the impacted role assignments corresponding to the designated resource or a resource that comprises the designated resource or that is comprised in the designated resource;

generating a static policy, which is defined by the impacted role assignments and the proposed role assignment;

converting the static policy into a first logical artifact;

converting a specification, which comprises security properties that define boundaries of specified allowed actions and specified disallowed actions with regard to at least a subset of the resources such that the boundaries define constraints on the role assignments and the proposed role assignment, and a relationship property, which defines a relationship between the specification and the static policy, into a second logical artifact;

prior to implementation of the proposed role assignment, determining whether the proposed role assignment conforms to the security properties in the specification by comparing the first logical artifact and the second logical artifact; and based at least on the proposed role assignment not conforming to at least one of the security properties, increasing security of the designated resource by inhibiting the designated principal from at least one of viewing the designated resource, deleting the designated resource, inserting information into the designated resource, or changing a value associated with the designated resource.

20. The computer program product of claim 19, wherein the operations comprise:

prior to implementation of the proposed role assignment, determining whether the proposed role assignment conforms to the security properties in the specification by comparing the first logical artifact and the second logical artifact in accordance with a satisfiability modulo theories technique.

* * * * *